(12) United States Patent
Kuo et al.

(10) Patent No.: US 8,378,588 B2
(45) Date of Patent: Feb. 19, 2013

(54) CIRCUITS AND METHODS FOR DRIVING LIGHT SOURCES

(75) Inventors: Ching Chuan Kuo, Taipei (TW); Yung Lin Lin, Palo Alto, CA (US)

(73) Assignee: O2Micro Inc, Santa Clara, CA (US)

( * ) Notice: Subject to any disclaimer, the term of this patent is extended or adjusted under 35 U.S.C. 154(b) by 0 days.

(21) Appl. No.: 13/028,626

(22) Filed: Feb. 16, 2011

(65) Prior Publication Data
US 2012/0038292 A1 Feb. 16, 2012

Related U.S. Application Data

(63) Continuation-in-part of application No. 12/415,028, filed on Mar. 31, 2009, now Pat. No. 8,076,867, which is a continuation-in-part of application No. 12/316,480, filed on Dec. 12, 2008, now Pat. No. 8,044,608.

(51) Int. Cl.
*H05B 37/02* (2006.01)
(52) U.S. Cl. ............... 315/291; 315/209 R; 315/307
(58) Field of Classification Search ............. 315/185 R, 315/186, 193, 209 R, 210, 211, 219, 224, 315/225, 244, 245, 246, 283, 287, 291, 307, 315/312–314, 362
See application file for complete search history.

(56) References Cited

U.S. PATENT DOCUMENTS

| | | | |
|---|---|---|---|
| 5,691,605 A | 11/1997 | Xia et al. | |
| 5,959,443 A | 9/1999 | Littlefield | |
| 6,320,330 B1 | 11/2001 | Haavisto et al. | |
| 6,727,662 B2 | 4/2004 | Konopka et al. | |
| 6,839,247 B1 | 1/2005 | Yang et al. | |
| 6,946,819 B2 | 9/2005 | Fagnani et al. | |
| 6,984,963 B2 | 1/2006 | Pidutti et al. | |
| 7,084,582 B2 | 8/2006 | Buonocunto | |
| 7,141,940 B2 | 11/2006 | Ortiz | |
| 7,148,664 B2 | 12/2006 | Takahashi et al. | |
| 7,180,274 B2 | 2/2007 | Chen et al. | |
| 7,190,124 B2 | 3/2007 | Kumar et al. | |
| 7,259,527 B2 | 8/2007 | Foo | |
| 7,288,902 B1 * | 10/2007 | Melanson | 315/291 |
| 7,304,464 B2 | 12/2007 | Weng et al. | |
| 7,307,614 B2 | 12/2007 | Vinn | |
| 7,312,783 B2 | 12/2007 | Oyama | |
| 7,323,828 B2 | 1/2008 | Russell et al. | |

(Continued)

FOREIGN PATENT DOCUMENTS

| | | |
|---|---|---|
| CN | 1498055 A | 5/2004 |
| CN | 1694597 A | 11/2005 |

(Continued)

OTHER PUBLICATIONS

The datasheet describes an universal high brightness LED driver HV9910B from Supertex Inc.

(Continued)

*Primary Examiner* — Jimmy Vu

(57) ABSTRACT

A driving circuit for driving a light source includes a converter and a dimming controller. The converter coupled to a power source is operable for receiving power from the power source and for providing regulated power to the light source according to control signals. The dimming controller coupled to the converter is operable for monitoring a power switch coupled between the power source and the converter, for receiving a color change signal indicating a first set of operations of the power switch and a dimming request signal indicating a second set of operations of the power switch, for controlling the control signals to change the color of the light source in response to the color change signal, and for controlling the control signals to adjust the brightness of the light source in response to the dimming request signal.

11 Claims, 20 Drawing Sheets

U.S. PATENT DOCUMENTS

| | | |
|---|---|---|
| 7,649,325 B2 | 1/2010 | McIntosh et al. |
| 7,710,084 B1 | 5/2010 | Guo |
| 7,759,881 B1 * | 7/2010 | Melanson .................... 315/307 |
| 7,800,315 B2 | 9/2010 | Shteynberg et al. |
| 7,804,256 B2 | 9/2010 | Melanson |
| 7,852,017 B1 | 12/2010 | Melanson |
| 7,863,828 B2 | 1/2011 | Melanson |
| 7,888,922 B2 | 2/2011 | Melanson |
| 7,944,153 B2 | 5/2011 | Greenfeld |
| 8,085,005 B2 | 12/2011 | Dearn |
| 8,232,780 B2 | 7/2012 | Uno |
| 8,274,800 B2 | 9/2012 | Uno et al. |
| 2004/0085030 A1 * | 5/2004 | Laflamme et al. ............ 315/291 |
| 2004/0130271 A1 | 7/2004 | Sekoguchi et al. |
| 2006/0012997 A1 | 1/2006 | Catalano et al. |
| 2006/0139907 A1 | 6/2006 | Yen |
| 2007/0182347 A1 * | 8/2007 | Shteynberg et al. ......... 315/312 |
| 2007/0262724 A1 | 11/2007 | Mednik et al. |
| 2008/0180075 A1 | 7/2008 | Xie et al. |
| 2008/0203946 A1 * | 8/2008 | Ito et al. ........................ 315/307 |
| 2008/0258641 A1 | 10/2008 | Nakagawa et al. |
| 2008/0258647 A1 | 10/2008 | Scianna |
| 2009/0167187 A1 | 7/2009 | Kitagawa et al. |
| 2009/0184662 A1 | 7/2009 | Given et al. |
| 2009/0189548 A1 | 7/2009 | Hoffman et al. |
| 2009/0195180 A1 | 8/2009 | Chenetz |
| 2009/0224686 A1 | 9/2009 | Kunimatsu |
| 2009/0251059 A1 | 10/2009 | Veltman |
| 2009/0295303 A1 | 12/2009 | Pucko et al. |
| 2009/0322254 A1 | 12/2009 | Lin |
| 2009/0322255 A1 | 12/2009 | Lin |
| 2010/0013409 A1 | 1/2010 | Quek et al. |
| 2010/0308733 A1 | 12/2010 | Shao |
| 2011/0001766 A1 | 1/2011 | Hua et al. |
| 2011/0013437 A1 | 1/2011 | Uruno et al. |
| 2011/0050185 A1 | 3/2011 | Notman et al. |
| 2011/0140630 A1 | 6/2011 | Doudousakis et al. |
| 2012/0081018 A1 | 4/2012 | Shteynberg et al. |

FOREIGN PATENT DOCUMENTS

| | | |
|---|---|---|
| CN | 1760721 A | 4/2006 |
| CN | 101176386 A | 5/2008 |
| CN | 101179879 A | 5/2008 |
| CN | 101193486 A | 6/2008 |
| CN | 101222800 A | 7/2008 |
| CN | 101370335 A | 2/2009 |
| CN | 101466186 A | 6/2009 |
| CN | 101472368 A | 7/2009 |
| CN | 101500354 A | 8/2009 |
| CN | 101511136 A | 8/2009 |
| CN | 101572974 A | 11/2009 |
| CN | 101605413 A | 12/2009 |
| CN | 101605416 A | 12/2009 |
| CN | 101742771 A | 6/2010 |
| CN | 101801129 A | 8/2010 |
| CN | 101815383 A | 8/2010 |
| CN | 201682668 U | 12/2010 |
| EP | 1565042 A2 | 8/2005 |
| EP | 2026634 A1 | 2/2009 |
| EP | 2273851 A2 | 1/2011 |
| WO | 2008001246 A1 | 1/2008 |

OTHER PUBLICATIONS

The datasheet describes A PWM high efficiency LED driver controller A704 from ADDtek Corp., Aug. 2008.
English translation of abstract of CN101815383A.
English translation of abstract of CN101466186A.
English translation of abstract of CN101742771A.

* cited by examiner

US 8,378,588 B2

CIRCUITS AND METHODS FOR DRIVING LIGHT SOURCES

RELATED APPLICATION

This application is a continuation-in-part of the U.S. application Ser. No. 12/415,028, titled "Driving Circuit with Continuous Dimming Function for Driving Light sources", filed on Mar. 31, 2009 now U.S. Pat. No. 8,076,867, which is hereby incorporated by reference in its entirety and which itself is a continuation-in-part of the U.S. patent application Ser. No. 12/316,480, filed on Dec. 12, 2008 now U.S. Pat. No. 8,044,608, titled "Driving Circuit with Dimming Controller for Driving Light Sources".

BACKGROUND

In recent years, light sources such as light-emitting diodes (LEDs) have been improved through technological advances in material and manufacturing processes. LED possesses relatively high efficiency, long life, vivid colors and can be used in a variety of industries including the automotive, computer, telecom, military and consumer goods, etc. One example is an LED lamp which uses LEDs to replace traditional light sources such as electrical filament.

FIG. 1 shows a schematic diagram of a conventional LED driving circuit 100. The LED driving circuit 100 utilizes an LED string 106 as a light source. The LED string 106 includes a group of LEDs connected in series. A power converter 102 converts an input voltage Vin to a desired output DC voltage Vout for powering the LED string 106. A switch 104 coupled to the LED driving circuit 100 can enable or disable the input voltage Vin to the LED string 106, and therefore can turn on or turn off the LED lamp. The power converter 102 receives a feedback signal from a current sensing resistor Rsen and adjusts the output voltage Vout to make the LED string 106 generate a desired light output. One of the drawbacks of this solution is that a desired light output is predetermined. In operation, the light output of the LED string 106 is set to a predetermined level and may not be adjusted by users.

FIG. 2 illustrates a schematic diagram of another conventional LED driving circuit 200. A power converter 102 converts an input voltage Vin to a desired output DC voltage Vout for powering the LED string 106. A switch 104 coupled to LED driving circuit 100 can enable or disable the input voltage Vin to the LED string 106, and therefore can turn on or turn off the LED lamp. The LED string 106 is coupled to a linear LED current regulator 208. Operational amplifiers 210 in the linear LED current regulator 208 compares a reference signal REF and a current monitoring signal from current sensing resistor Rsen, and generates a control signal to adjust the resistance of transistor Q1 in a linear mode. Therefore, the LED current flowing through the LED string 106 can be adjusted accordingly. In this solution, in order to control the light output of the LED string 106, users may need to use a dedicated apparatus, such as a specially designed switch with adjusting buttons or a switch that can receive a remote control signal, to adjust the reference signal REF.

SUMMARY

In one embodiment, a driving circuit for driving a light source includes a converter and a dimming controller. The converter coupled to a power source is operable for receiving power from the power source and for providing regulated power to the light source according to control signals. The dimming controller coupled to the converter is operable for monitoring a power switch coupled between the power source and the converter, for receiving a color change signal indicating a first set of operations of the power switch and a dimming request signal indicating a second set of operations of the power switch, for controlling the control signals to change the color of the light source in response to the color change signal, and for controlling the control signals to adjust the brightness of the light source in response to the dimming request signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
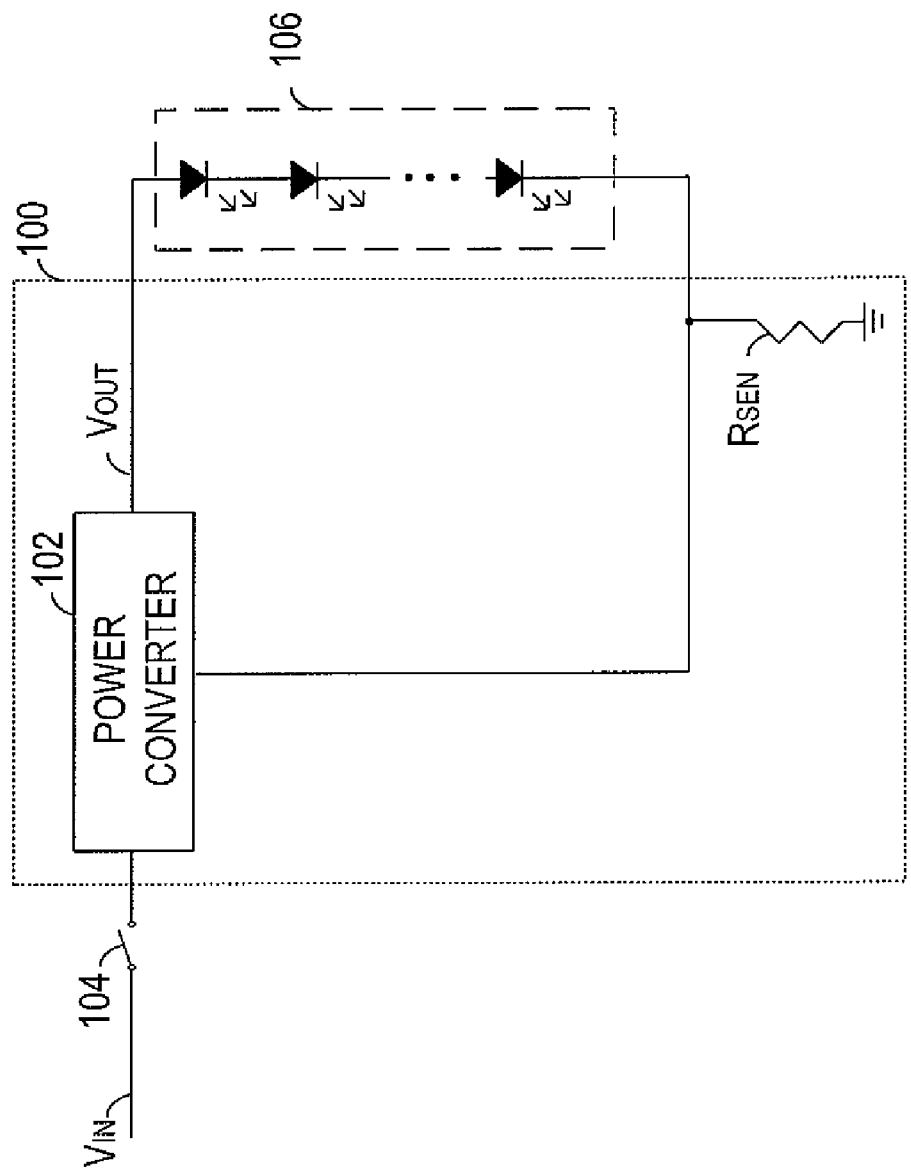
FIG. 1 shows a schematic diagram of a conventional LED driving circuit.
Figure 2:
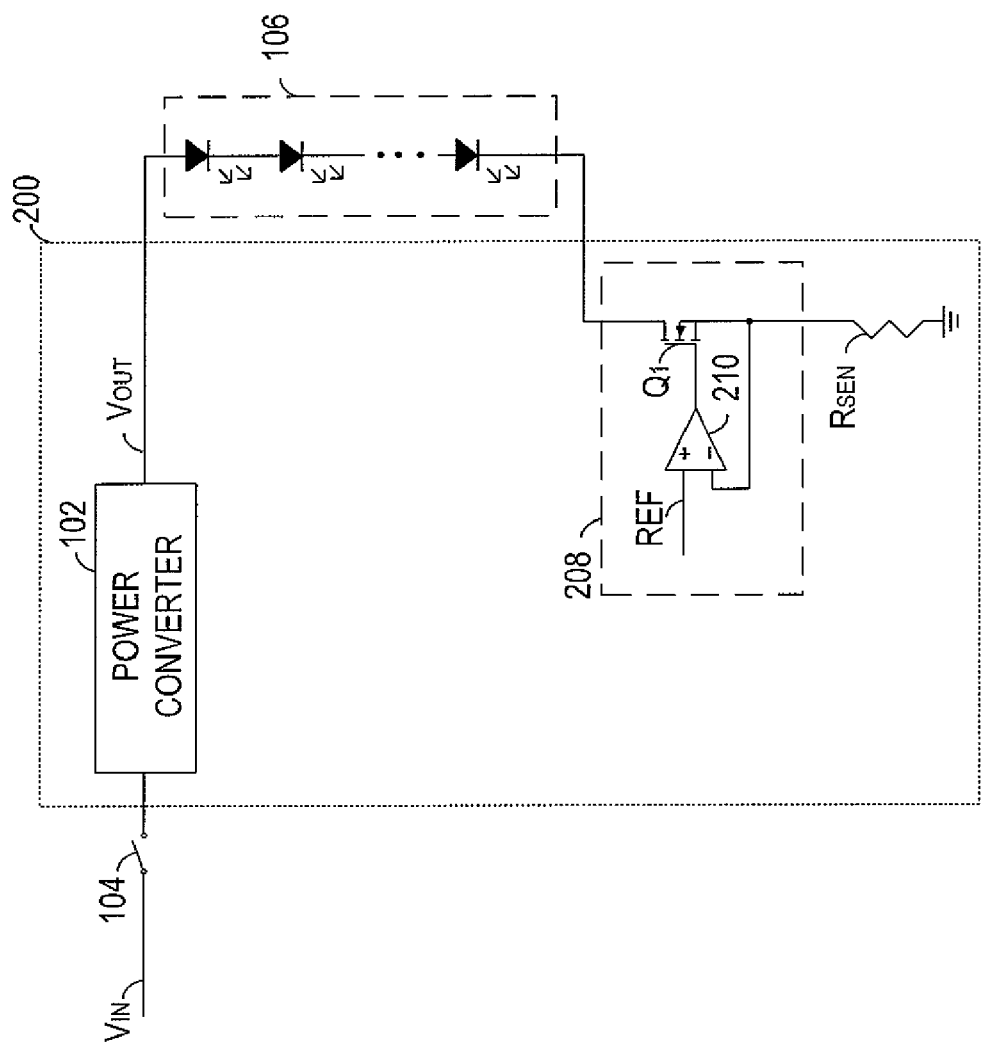
FIG. 2 shows a schematic diagram of another conventional LED driving circuit.
Figure 3:
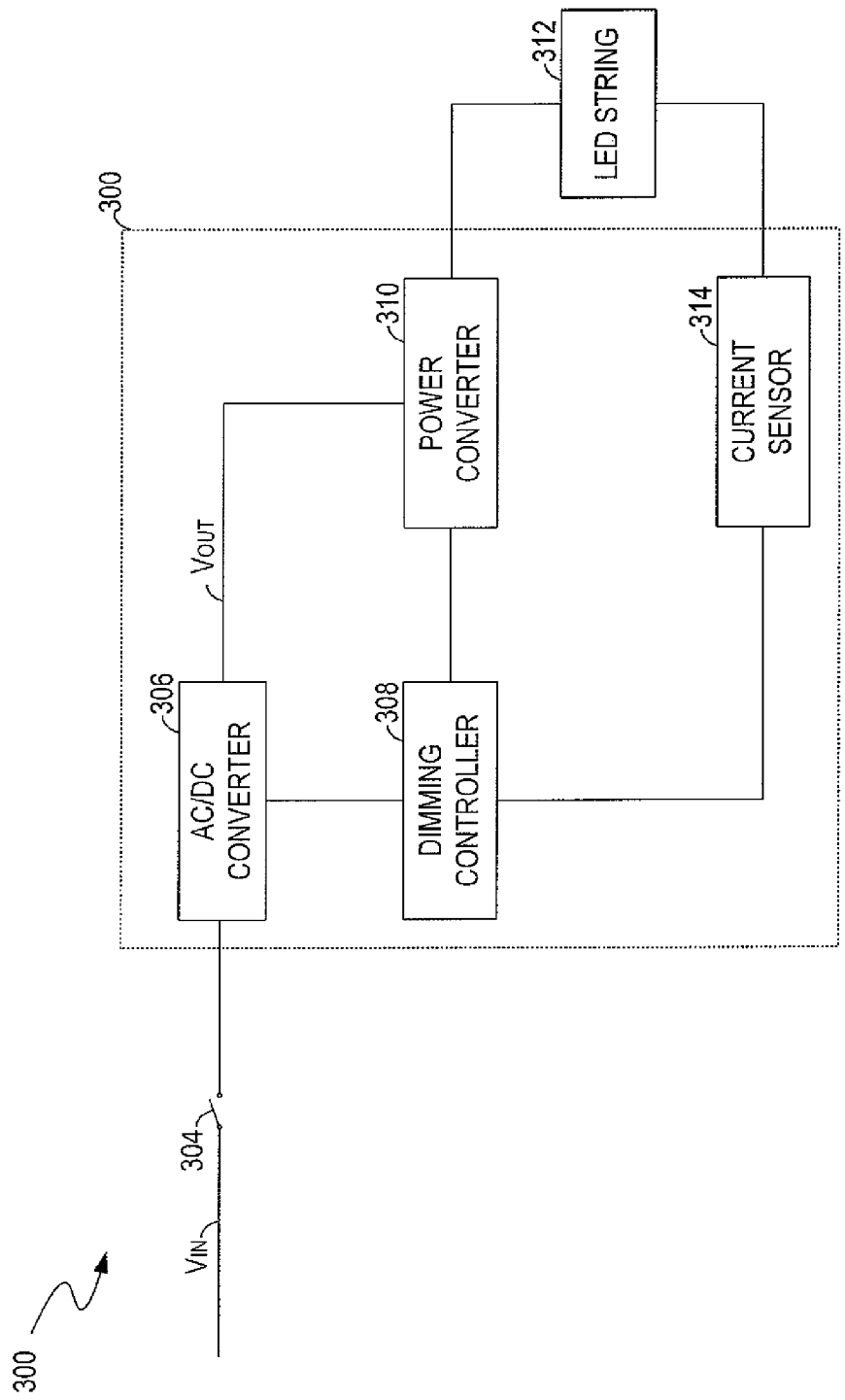
FIG. 3 shows a block diagram of a light source driving circuit, in accordance with one embodiment of the present invention.

FIG. 3 shows an example of a block diagram of a light source driving circuit 300, in accordance with one embodiment of the present invention. In one embodiment, a power switch 304 coupled between a power source Vin and the light source driving circuit 300 is operable for selectively coupling the power source to the light source driving circuit 300. The light source driving circuit 300 includes an AC/DC converter 306 for converting an AC input voltage Vin from the power source to a DC voltage Vout, a power converter 310 coupled to the AC/DC converter 306 for providing an LED string 312 with a regulated power, a dimming controller 308 coupled to the power converter 310 for receiving a switch monitoring signal indicative of an operation of the power switch 304 and for adjusting the regulated power from the power converter 310 according to the switch monitoring signal, and a current sensor 314 for sensing an LED current flowing through the LED string 312. In one embodiment, the power switch 304 can be an on/off switch mounted on the wall.

In operation, the AC/DC converter 306 converts the input AC voltage Vin to the output DC voltage Vout. The power converter 310 receives the DC voltage Vout and provides the LED string 312 with a regulated power. The current sensor 314 generates a current monitoring signal indicating a level of an LED current flowing through the LED string 312. The dimming controller 308 monitors the operation of the power switch 304, receives the current monitoring signal from the current sensor 314, and is operable for controlling the power converter 310 to adjust power of the LED string 312 in response to the operation of the power switch 304. In one embodiment, the dimming controller 308 operates in an analog dimming mode and adjusts the power of the LED string 312 by adjusting a reference signal indicating a peak value of the LED current. In another embodiment, the dimming controller 308 operates in a burst dimming mode and adjusts the power of the LED string 312 by adjusting a duty cycle of a pulse width modulation (PWM) signal. By adjusting the power of the LED string 312, the light output of the LED string 312 can be adjusted accordingly.

Figure 4:
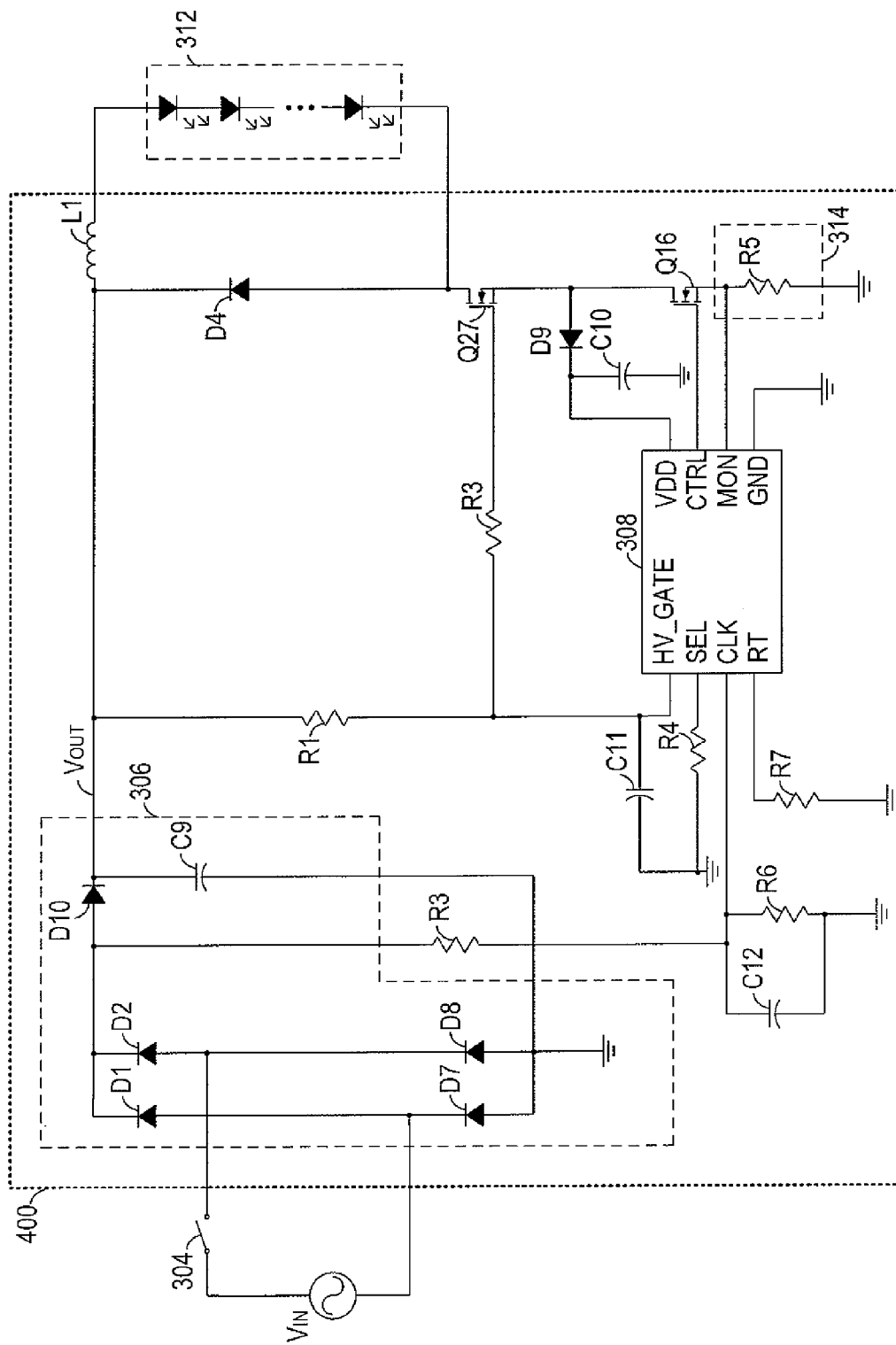
FIG. 4 shows a schematic diagram of a light source driving circuit, in accordance with one embodiment of the present invention.

FIG. 4 shows an example of a schematic diagram of a light source driving circuit 400, in accordance with one embodiment of the present invention. FIG. 4 is described in combination with FIG. 3. Elements labeled the same as in FIG. 3 have similar functions and will not be detailed described herein.

The light source driving circuit 400 includes a power converter 310 (shown in FIG. 3) coupled to a power source and coupled to an LED string 312 for receiving power from the power source and for providing a regulated power to the LED string 312. In the example of FIG. 4, the power converter 310 can be a buck converter including an inductor L1, a diode D4 and a control switch Q16. In the embodiment shown in FIG. 4, the control switch Q16 is implemented outside the dimming controller 308. In another embodiment, the control switch Q16 can be integrated in the dimming controller 308.

A dimming controller 308 is operable for receiving a switch monitoring signal indicative of an operation of a power switch, e.g., a power switch 304 coupled between the power source Vin and the light source driving circuit 400, and for adjusting the regulated power from the power converter 310 (including the inductor L1, the diode D4 and the control switch Q16) by controlling the control switch Q16 coupled in series with the LED string 312 according to the switch monitoring signal. The light source driving circuit 400 can further include an AC/DC converter 306 for converting an AC input voltage Vin to a DC output voltage Vout, and a current sensor 314 for sensing an LED current flowing through the LED string 312. In the example of FIG. 4, the AC/DC converter 306 can be a bridge rectifier including diodes D1, D2, D7, D8, D10, and a capacitor C9. The current sensor 314 can include a current sensing resistor R5.

In one embodiment, terminals of the dimming controller 308 can include HV_GATE, SEL, CLK, RT, VDD, CTRL, MON and GND. The terminal HV_GATE is coupled to a switch Q27 through a resistor R3 for controlling a conductance status, e.g., ON/OFF status, of the switch Q27 coupled to the LED string 312. A capacitor C11 is coupled between the terminal HV_GATE and ground for regulating a gate voltage of the switch Q27.

A user can select a dimming mode, e.g., an analog dimming mode or a burst dimming mode, by coupling the terminal SEL to ground through a resistor R4 (as shown in FIG. 4), or coupling the terminal SEL to ground directly.

The terminal CLK is coupled to the AC/DC converter 306 through a resistor R3, and is coupled to ground through a resistor R6. The terminal CLK can receive a switch monitoring signal indicating an operation of the power switch 304. In one embodiment, the switch monitoring signal can be generated at a common node between the resistor R3 and the resistor R6. A capacitor C12 is coupled to the resistor R6 in parallel for filtering undesired noises. The terminal RT is coupled to ground through a resistor R7 for determining a frequency of a pulse signal generated by the dimming controller 308.

The terminal VDD is coupled to the switch Q27 through a diode D9 for supplying power to the dimming controller 308. In one embodiment, an energy storage unit, e.g., a capacitor C10, coupled between the terminal VDD and ground can power the dimming controller 308 when the power switch 304 is turned off. In an alternate embodiment, the energy storage unit can be integrated in the dimming controller 308. The terminal GND is coupled to ground.

The terminal CTRL is coupled to the control switch Q16. The control switch Q16 is coupled in series with the LED string 312 and the switch Q27, and is coupled to ground through the current sensing resistor R5. The dimming controller 308 is operable for adjusting the regulated power from the power converter 310 by controlling a conductance status, e.g., ON and OFF status, of the control switch Q16 using a control signal via the terminal CTRL. The terminal MON is coupled to the current sensing resistor R5 for receiving a current monitoring signal indicating an LED current flowing through the LED string 312. When the switch Q27 is turned on, the dimming controller 308 can adjust the LED current flowing through the LED string 312 to ground by controlling the control switch Q16.

In operation, when the power switch 304 is turned on, the AC/DC converter 306 converts an input AC voltage Vin to a DC voltage Vout. A predetermined voltage at the terminal HV_GATE is supplied to the switch Q27 through the resistor R3 so that the switch Q27 is turned on.

If the dimming controller 308 turns on the control switch Q16, the DC voltage Vout powers the LED string 312 and charges the inductor L1. An LED current flows through the inductor L1, the LED string 312, the switch Q27, the control switch Q16, the current sensing resistor R5 to ground. If the dimming controller 308 turns off the control switch Q16, an LED current flows through the inductor L1, the LED string 312 and the diode D4. The inductor L1 is discharged to power the LED string 312. As such, the dimming controller 308 can adjust the regulated power from the power converter 310 by controlling the control switch Q16.

When the power switch 304 is turned off, the capacitor C10 is discharged to power the dimming controller 308. A voltage across the resistor R6 drops to zero, therefore a switch monitoring signal indicating a turn-off operation of the power switch 304 can be detected by the dimming controller 308 through the terminal CLK. Similarly, when the power switch 304 is turned on, the voltage across the resistor R6 rises to a predetermined voltage, therefore a switch monitoring signal indicating a turn-on operation of the power switch 304 can be detected by the dimming controller 308 through the terminal CLK. If a turn-off operation is detected, the dimming controller 308 can turn off the switch Q27 by pulling the voltage at the terminal HV_GATE to zero such that the LED string 312 can be turned off after the inductor L1 completes discharging. In response to the turn-off operation, the dimming controller 308 can adjust a reference signal indicating a target light output of the LED string 312. Therefore, when the power switch 304 is turned on next time, the LED string 312 can generate a light output according to the adjusted target light output. In other words, the light output of the LED string 312 can be adjusted by the dimming controller 308 in response to the turn-off operation of the power switch 304.

Figure 5:
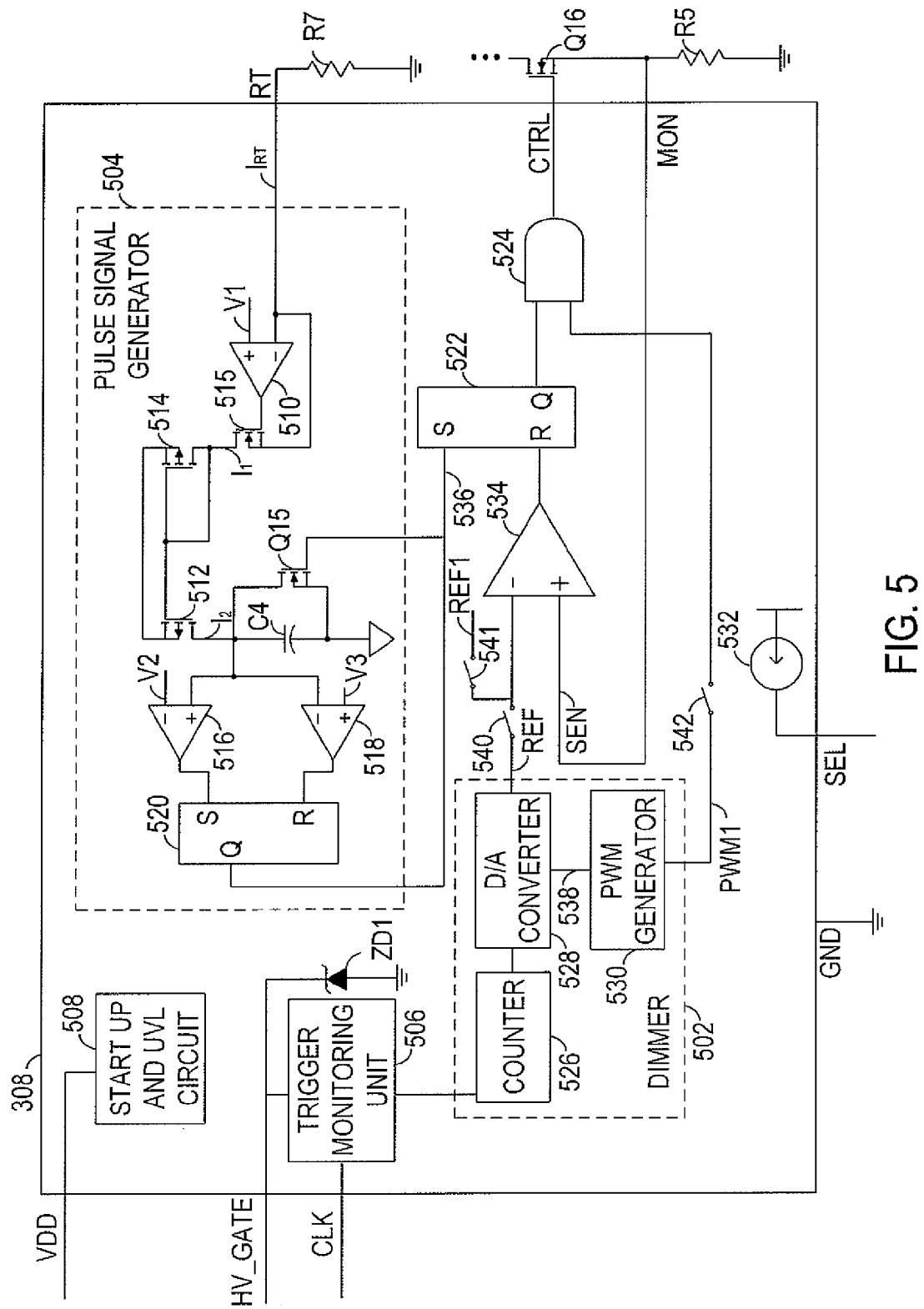
FIG. 5 shows a structure of a dimming controller in FIG. 4, in accordance with one embodiment of the present invention.

FIG. 5 shows an example of a structure of the dimming controller 308 in FIG. 4, in accordance with one embodiment of the present invention. FIG. 5 is described in combination with FIG. 4. Elements labeled the same as in FIG. 4 have similar functions and will not be detailed described herein.

The dimming controller 308 includes a trigger monitoring unit 506, a dimmer 502 and a pulse signal generator 504. The trigger monitoring unit 506 is coupled to ground through a Zener diode ZD1. The trigger monitoring unit 506 can receive a switch monitoring signal indicating an operation of the external power switch 304 through the terminal CLK and can generate a driving signal for driving a counter 526 when an operation of the external power switch 304 is detected at the terminal CLK. The trigger monitoring unit 506 is further operable for controlling a conductance status of the switch Q27. The dimmer 502 is operable for generating a reference signal REF to adjust power of the LED string 312 in an analog dimming mode, or generating a control signal 538 for adjusting a duty cycle of a PWM signal PWM1 to adjust the power of the LED string 312. The pulse signal generator 504 is operable for generating a pulse signal which can turn on a control switch Q16. The dimming controller 308 can further include a start up and under voltage lockout (UVL) circuit 508 coupled to the terminal VDD for selectively turning on one or more components of the dimming controller 308 according to different power condition.

In one embodiment, the start up and under voltage lockout circuit 508 is operable for turning on all the components of the dimming controller 308 when the voltage at the terminal VDD is greater than a first predetermined voltage. When the power switch 304 is turned off, the start up and under voltage lockout circuit 508 is operable for turning off other components of the dimming controller 308 except the trigger monitoring unit 506 and the dimmer 502 when the voltage at the terminal VDD is less than a second predetermined voltage, in order to save energy. The start up and under voltage lockout circuit 508 is further operable for turning off the trigger monitoring unit 506 and the dimmer 502 when the voltage at the terminal VDD is less than a third predetermined voltage. In one embodiment, the first predetermined voltage is greater than the second predetermined voltage and the second predetermined voltage is greater than the third predetermined voltage. Because the dimming controller 308 can be powered by the capacitor C10 through the terminal VDD, the trigger monitoring unit 506 and the dimmer 502 can still operate for a time period after the power switch 304 is turned off.

In the dimming controller 308, the terminal SEL is coupled to a current source 532. Users can choose a dimming mode by configuring the terminal SEL, e.g., by coupling the terminal SEL directly to ground or coupling the terminal SEL to ground via a resistor. In one embodiment, the dimming mode can be determined by measuring a voltage at the terminal SEL. If the terminal SEL is directly coupled to ground, the voltage at the terminal SEL is approximately equal to zero. A control circuit can in turn switch on a switch 540, switch off a switch 541 and switch off a switch 542. Therefore, the dimming controller 308 can work in an analog dimming mode and can adjust the power of the LED string 312 (shown in FIG. 4) by adjusting a reference signal REF. In one embodiment, if the terminal SEL is coupled to ground via a resistor R4 having a predetermined resistance (as shown in FIG. 4), the voltage at the terminal SEL can be greater than zero. The control circuit can in turn switch off the switch 540, switch on the switch 541 and switch on the switch 542. Therefore, the dimming controller 308 can work in a burst dimming mode and can adjust the power of the LED string 312 (shown in FIG. 4) by adjusting a duty cycle of a PWM signal PWM1. In other words, different dimming modes can be selected by controlling the ON/OFF status of the switch 540, switch 541 and switch 542. The ON/OFF status of the switch 540, switch 541 and switch 542 can be determined by the voltage at the terminal SEL.

The pulse signal generator 504 is coupled to ground through the terminal RT and the resistor R7 for generating a pulse signal 536 which can turn on the control switch Q16. The pulse signal generator 504 can have different configurations and is not limited to the configuration as shown in the example of FIG. 5.

In the pulse signal generator 504, the non-inverting input of an operational amplifier 510 receives a predetermined voltage V1. Thus, the voltage of the inverting input of the operational amplifier 510 can be forced to V1. A current IRT flows through the terminal RT and the resistor R7 to ground. A current I1 flowing through a MOSFET 514 and a MOSFET 515 is equal to IRT. Because the MOSFET 514 and a MOSFET 512 constitute a current mirror, a current I2 flowing through the MOSFET 512 is also substantially equal to IRT. The output of a comparator 516 and the output of a comparator 518 are respectively coupled to the S input and the R input of an SR flip-flop 520. The inverting input of the comparator 516 receives a predetermined voltage V2. The non-inverting input of the comparator 518 receives a predetermined voltage V3. V2 is greater than V3, and V3 is greater than zero, in one embodiment. A capacitor C4 is coupled between the MOSFET 512 and ground, and has one end coupled to a common node between the non-inverting input of the comparator 516 and the inverting input of the comparator 518. The Q output of the SR flip-flop 520 is coupled to the switch Q15 and the S input of an SR flip-flop 522. The switch Q15 is coupled in parallel with the capacitor C4. A conductance status, e.g., ON/OFF status, of the switch Q15 can be determined by the Q output of the SR flip-flop 520.

Initially, the voltage across the capacitor C4 is approximately equal to zero which is less than V3. Therefore, the R input of the SR flip-flop 520 receives a digital 1 from the output of the comparator 518. The Q output of the SR flip-flop 520 is set to digital 0, which turns off the switch Q15. When the switch Q15 is turned off, the voltage across the capacitor C4 increases as the capacitor C4 is charged by I2. When the voltage across C4 is greater than V2, the S input of the SR flip-flop 520 receives a digital 1 from the output of the comparator 516. The Q output of the SR flip-flop 520 is set to digital 1, which turns on the switch Q15. When the switch Q15 is turned on, the voltage across the capacitor C4 decreases as the capacitor C4 discharges through the switch Q15. When the voltage across the capacitor C4 drops below V3, the comparator 518 outputs a digital 1, and the Q output of the SR flip-flop 520 is set to digital 0, which turns off the switch Q15. Then the capacitor C4 is charged by I2 again. As such, through the process described above, the pulse signal generator 504 can generate a pulse signal 536 which includes a series of pulses at the Q output of the SR flip-flop 520. The pulse signal 536 is sent to the S input of the SR flip-flop 522.

The trigger monitoring unit 506 is operable for monitoring an operation of the power switch 304 through the terminal CLK, and is operable for generating a driving signal for driving the counter 526 when an operation of the power switch 304 is detected at the terminal CLK. In one embodiment, when the power switch 304 is turned on, the voltage at the terminal CLK rises to a level that is equal to a voltage across the resistor R6 (shown in FIG. 4). When the power switch 304 is turned off, the voltage at the terminal CLK drops to zero. Therefore, a switch monitoring signal indicating the operation of the power switch 304 can be detected at the terminal CLK. In one embodiment, the trigger monitoring unit 506 generates a driving signal when a turn-off operation is detected at the terminal CLK.

The trigger monitoring unit 506 is further operable for controlling a conductance status of the switch Q27 through the terminal HV_GATE. When the power switch 304 is turned on, a breakdown voltage across the Zener diode ZD1 is applied to the switch Q27 through the resistor R3. Therefore, the switch Q27 can be turned on. The trigger monitoring unit 506 can turn off the switch Q27 by pulling the voltage at the terminal HV_GATE to zero. In one embodiment, the trigger monitoring unit 506 turns off the switch Q27 when a turn-off operation of the power switch 304 is detected at the terminal CLK and turns on the switch Q27 when a turn-on operation of the power switch 304 is detected at the terminal CLK.

In one embodiment, the dimmer 502 includes a counter 526 coupled to the trigger monitoring unit 506 for counting operations of the power switch 304, a digital-to-analog converter (D/A converter) 528 coupled to the counter 526. The dimmer 502 can further include a PWM generator 530 coupled to the D/A converter 528. The counter 526 can be driven by the driving signal generated by the trigger monitoring unit 506. More specifically, when the power switch 304 is turned off, the trigger monitoring unit 506 detects a negative edge of the voltage at the terminal CLK and generates a driving signal, in one embodiment. The counter value of the counter 526 can be increased, e.g., by 1, in response to the driving signal. The D/A converter 528 reads the counter value from the counter 526 and generates a dimming signal (e.g., control signal 538 or reference signal REF) based on the counter value. The dimming signal can be used to adjust a target power level of the power converter 310, which can in turn adjust the light output of the LED string 312.

In the burst dimming mode, the switch 540 is off, the switch 541 and the switch 542 are on. The inverting input of the comparator 534 receives a reference signal REF1 which can be a DC signal having a predetermined substantially constant voltage. The voltage of REF1 can determine a peak value of the LED current, which can in turn determine the maximum light output of the LED string 312. The dimming signal can be a control signal 538 which is applied to the PWM generator 530 for adjusting a duty cycle of the PWM signal PWM1. By adjusting the duty cycle of PWM1, the light output of the LED string 312 can be adjusted no greater than the maximum light output determined by REF1. For example, if PWM1 has a duty cycle of 100%, the LED string 312 can have the maximum light output. If the duty cycle of PWM1 is less than 100%, the LED string 312 can have a light output that is lower than the maximum light output.

In the analog dimming mode, the switch 540 is on, the switch 541 and the switch 542 are off, and the dimming signal can be an analog reference signal REF having an adjustable voltage. The D/A converter 528 can adjust the voltage of the reference signal REF according to the counter value of the counter 526. The voltage of REF can determine a peak value of the LED current, which can in turn determine an average value of the LED current. As such, the light output of the LED string 312 can be adjusted by adjusting the reference signal REF.

In one embodiment, the D/A converter 528 can decrease the voltage of REF in response to an increase of the counter value. For example, if the counter value is 0, the D/A converter 528 adjusts the reference signal REF to have a voltage V4. If the counter value is increased to 1 when a turn-off operation of the power switch 304 is detected at the terminal CLK by the trigger monitoring unit 506, the D/A converter 528 adjusts the reference signal REF to have a voltage V5 that is less than V4. Yet in another embodiment, the D/A converter 528 can increase the voltage of REF in response to an increase of the counter value.

In one embodiment, the counter value will be reset to zero after the counter 526 reaches its maximum counter value. For example, if the counter 526 is a 2-bit counter, the counter value will increase from 0 to 1, 2, 3 and then return to zero after four turn-off operations have been detected. Accordingly, the light output of the LED string 312 can be adjusted from a first level to a second level, then to a third level, then to a fourth level, and then back to the first level.

The inverting input of a comparator 534 can selectively receive the reference signal REF and the reference signal REF1. For example, the inverting input of the comparator 534 receives the reference signal REF through the switch 540 in the analog dimming mode, and receives the reference signal REF1 through the switch 541 in the burst dimming mode. The non-inverting input of the comparator 534 is coupled to the resistor R5 through the terminal MON for receiving a current monitoring signal SEN from the current sensing resistor R5. The voltage of the current monitoring signal SEN can indicate an LED current flowing through the LED string 312 when the switch Q27 and the control switch Q16 are turned on.

The output of the comparator 534 is coupled to the R input of the SR flip-flop 522. The Q output of the SR flip-flop 522 is coupled to an AND gate 524. The PWM signal PWM1 generated by the PWM generator 530 is applied to the AND gate 524. The AND gate 524 outputs a control signal to control the control switch Q16 through the terminal CTRL.

If the analog dimming mode is selected, the switch 540 is turned on and the switches 541 and 542 are turned off. The control switch Q16 is controlled by the SR flip-flop 522. In operation, when the power switch 304 is turned on, the breakdown voltage across the Zener diode ZD1 turns on the switch Q27. The SR flip-flop 522 generates a digital 1 at the Q output to turn on the control switch Q16 in response to the pulse signal 536 generated by the pulse generator 504. An LED current flowing through the inductor L1, the LED string 312, the switch Q27, the control switch Q16, the current sensing resistor R5 to ground. The LED current gradually increases because the inductor resists a sudden change of the LED current. As a result, the voltage across the current sensing resistor R5, that is, the voltage of the current monitoring signal SEN can be increased. When the voltage of SEN is greater than that of the reference signal REF, the comparator 534 generates a digital 1 at the R input of the SR flip-flop 522 so that the SR flip-flop 522 generates a digital 0 to turn off the control switch Q16. After the control switch Q16 is turned off, the inductor L1 is discharged to power the LED string 312. An LED current which flows through the inductor L1, the LED string 312 and the diode D4 gradually decreases. The control switch Q16 is turned on when the SR flip-flop 522 receives a pulse at the S input again, and then the LED current flows through the current sensing resistor R5 to ground again. When the voltage of the current monitoring signal SEN is greater than that of the reference signal REF, the control switch Q16 is turned off by the SR flip-flop 522. As described above, the reference signal REF determines a peak value of the LED current, which can in turn determine the light output of the LED string 312. By adjusting the reference signal REF, the light output of the LED string 312 can be adjusted.

In the analog dimming mode, when the power switch 304 is turned off, the capacitor C10 (shown in FIG. 4) is discharged to power the dimming controller 308. The counter value of the counter 526 can be increased by 1 when the trigger monitoring unit 506 detects a turn-off operation of the power switch 304 at the terminal CLK. The trigger monitoring unit 506 can turn off the switch Q27 in response to the turn-off operation of the power switch 304. The D/A converter 528 can adjust the voltage of the reference signal REF from a first level to a second level in response to the change of the counter value. Therefore, the light output of the LED string 312 can be adjusted in accordance with the adjusted reference signal REF when the power switch 304 is turned on.

If the burst dimming mode is selected, the switch 540 is turned off and the switches 541 and 542 are turned on. The inverting input of the comparator 534 receives a reference signal REF1 having a predetermined voltage. The control switch Q16 is controlled by both of the SR flip-flop 522 and the PWM signal PWM1 through the AND gate 524. The reference signal REF1 can determine a peak value of the LED current, which can in turn determine a maximum light output of the LED string 312. The duty cycle of the PWM signal PWM1 can determine the on/off time of the control switch Q16. When the PWM signal PWM1 is logic 1, the conductance status of the control switch Q16 is determined by the Q output of the SR flip-flop 522. When the PWM signal PWM1 is logic 0, the control switch Q16 is turned off. By adjusting the duty cycle of the PWM signal PWM1, the power of the LED string 312 can be adjusted accordingly. As such, the combination of the reference signal REF1 and the PWM signal PWM1 can determine the light output of the LED string 312.

In the burst dimming mode, when the power switch 304 is turned off, a turn-off operation of the power switch 304 can be detected by the trigger monitoring unit 506 at the terminal CLK. The trigger monitoring unit 506 turns off the switch Q27 and generates a driving signal. The counter value of the counter 526 can be increased, e.g., by 1, in response of the driving signal. The D/A converter 528 can generate the control signal 538 to adjust the duty cycle of the PWM signal PWM1 from a first level to a second level. Therefore, when the power switch 304 is turned on next time, the light output of the LED string 312 can be adjusted to follow a target light output which is determined by the reference signal REF1 and the PWM signal PWM1.

Figure 6:
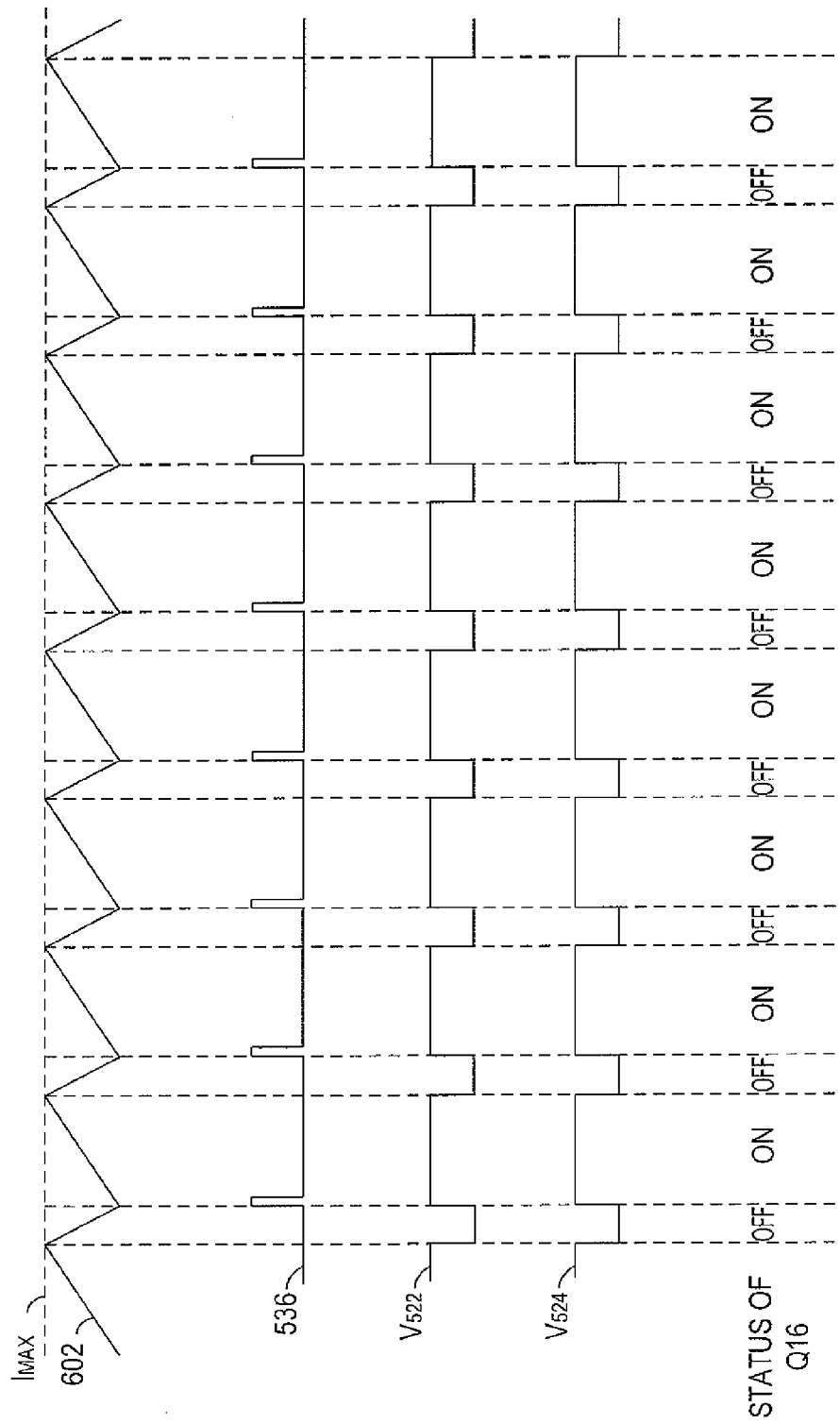
FIG. 6 illustrates signal waveforms in the analog dimming mode, in accordance with one embodiment of the present invention.

FIG. 6 illustrates examples of signal waveforms of an LED current 602 flowing through the LED string 312, the pulse signal 536, V522 which indicates the output of the SR flip-flop 522, V524 which indicates the output of the AND gate 524, and the ON/OFF status of the control switch Q16 in the analog dimming mode. FIG. 6 is described in combination with FIG. 4 and FIG. 5.

In operation, the pulse signal generator 504 generates pulse signal 536. The SR flip-flop 522 generates a digital 1 at the Q output in response to each pulse of the pulse signal 536. The control switch Q16 is turned on when the Q output of the SR flip-flop 522 is digital 1. When the control switch Q16 is turned on, the inductor L1 ramps up and the LED current 602 increases. When the LED current 602 reaches the peak value Imax, which means the voltage of the current monitoring signal SEN is substantially equal to the voltage of the reference signal REF, the comparator 534 generates a digital 1 at the R input of the SR flip-flop 522 so that the SR flip-flop 522 generates a digital 0 at the Q output. The control switch Q16 is turned off when the Q output of the SR flip-flop 522 is digital 0. When the control switch Q16 is turned off, the inductor L1 is discharged to power the LED string 312 and the LED current 602 decreases. In this analog dimming mode, by adjusting the reference signal REF, the average LED current can be adjusted accordingly and therefore the light output of the LED string 312 can be adjusted.

Figure 7:
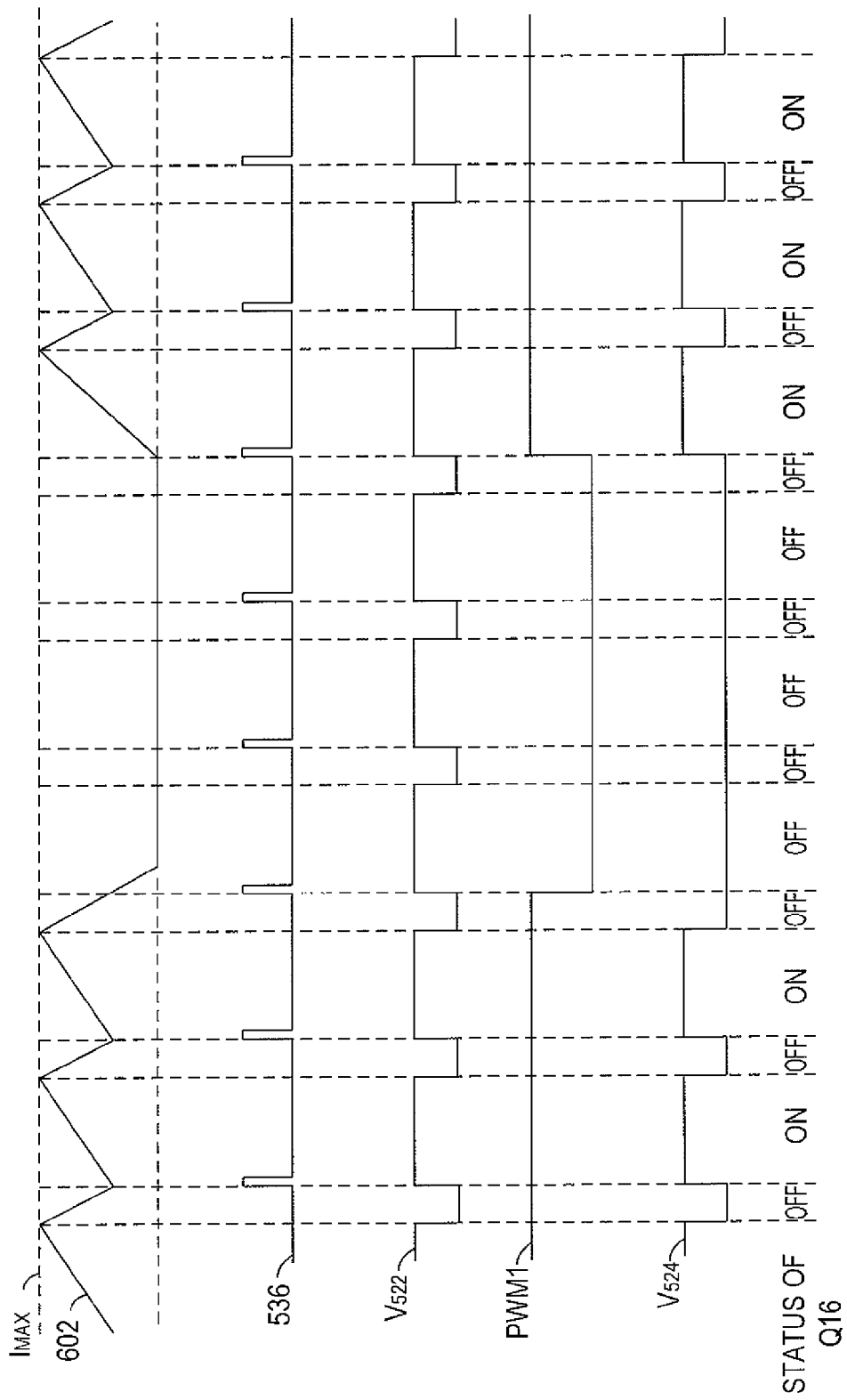
FIG. 7 illustrates signal waveforms in the burst dimming mode, in accordance with one embodiment of the present invention.

FIG. 7 illustrates examples of signal waveforms of the LED current 602 flowing through the LED string 312, the pulse signal 536, V522 which indicates the output of the SR flip-flop 522, V524 which indicates the output of the AND gate 524, and the ON/OFF status of the control switch Q16, and the PMW signal PWM1 in the burst dimming mode. FIG. 7 is described in combination with FIG. 4 and FIG. 5.

When PWM1 is digital 1, the relationship among the LED current 602, the pulse signal 536, V522, V524, and the ON/OFF status of the switch Q1 is similar to that is illustrated in FIG. 6. When PWM1 is digital 0, the output of the AND gate 524 turns to digital 0. Therefore, the control switch Q16 is turned off and the LED current 602 decreases. If the PWM1 holds digital 0 long enough, the LED current 602 can falls to zero. In this burst dimming mode, by adjusting the duty cycle of PWM1, the average LED current can be adjusted accordingly and therefore the light output of the LED string 312 can be adjusted.

Figure 8:
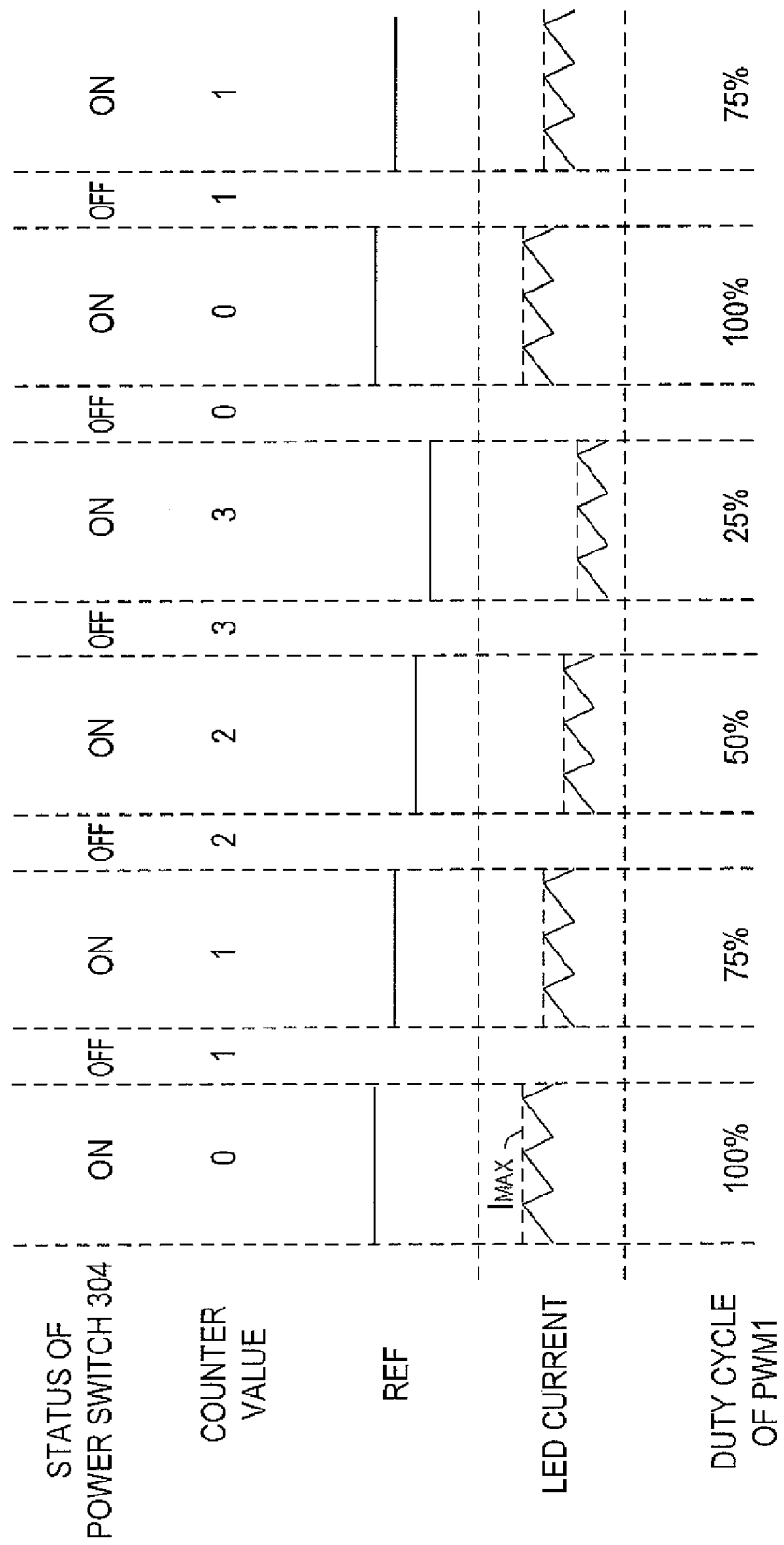
FIG. 8 illustrates a diagram illustrating an operation of a light source driving circuit which includes the dimming controller in FIG. 5, in accordance with one embodiment of the present invention.

FIG. 8 shows an example of a diagram illustrating an operation of a light source driving circuit which includes the dimming controller in FIG. 5, in accordance with one embodiment of the present invention. FIG. 8 is described in combination with FIG. 5.

In the example shown in FIG. 8, each time when a turn-off operation of the power switch 304 is detected by the trigger monitoring unit 506, the counter value of the counter 526 is increases by 1. The counter 526 can be a 2-bit counter which has a maximum counter value of 3.

In the analog dimming mode, the D/A converter 528 reads the counter value from the counter 526 and decreases the voltage of the reference signal REF in response to an increase of the counter value. The voltage of REF can determine a peak value Imax of the LED current, which can in turn determine an average value of the LED current. In the burst dimming mode, the D/A converter 528 reads the counter value from the counter 526 and decreases the duty cycle of the PWM signal PWM1 (e.g., decreases 25% each time) in response to an increase of the counter value. The counter 526 is reset after it reaches its maximum counter value (e.g., 3).

Figure 9:
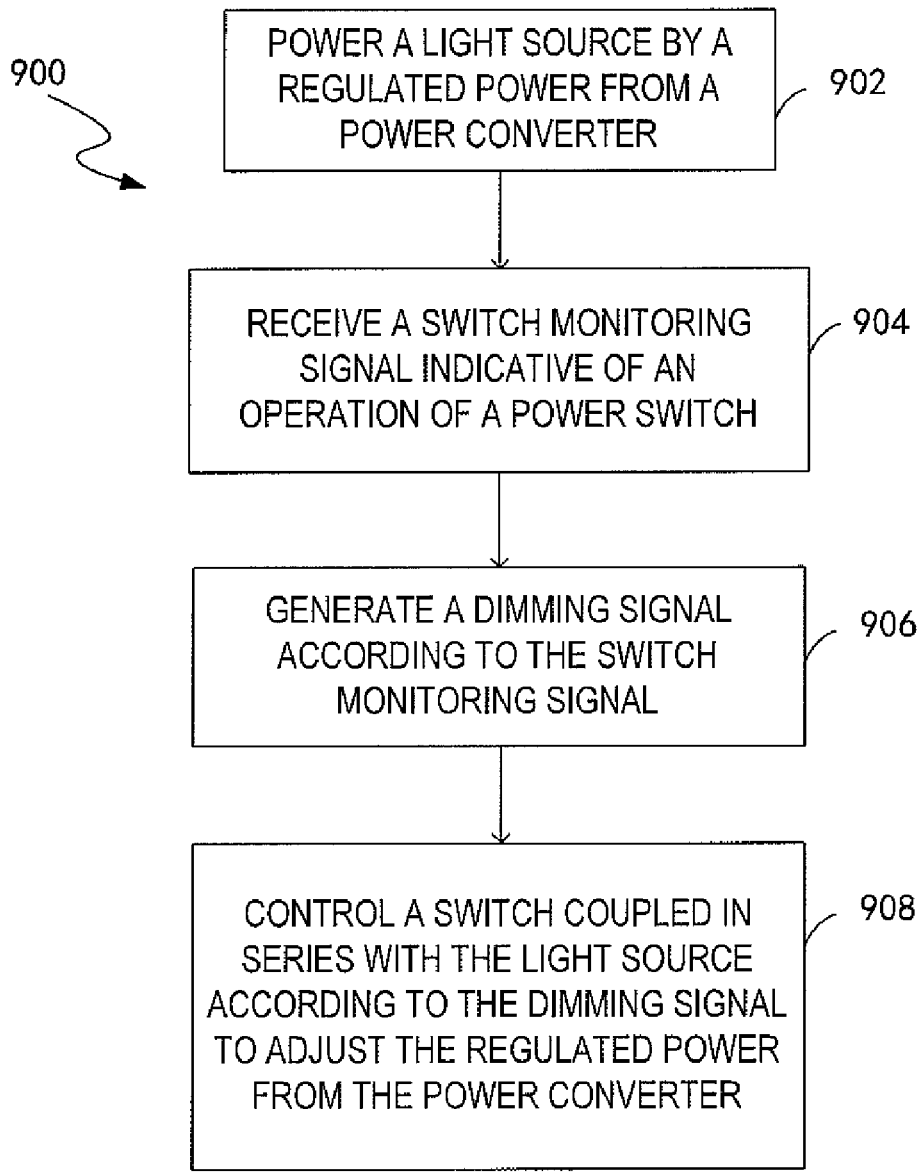
FIG. 9 shows a flowchart of a method for adjusting power of a light source, in accordance with one embodiment of the present invention.

FIG. 9 shows a flowchart 900 of a method for adjusting power of a light source, in accordance with one embodiment of the present invention. FIG. 9 is described in combination with FIG. 4 and FIG. 5.

In block 902, a light source, e.g., the LED string 312, is powered by a regulated power from a power converter, e.g., the power converter 310. In block 904, a switch monitoring signal can be received, e.g., by the dimming controller 308. The switch monitoring signal can indicate an operation of a power switch, e.g., the power switch 304 coupled between a power source and the power converter. In block 906, a dimming signal is generated according to the switch monitoring signal. In block 908, a switch coupled in series with the light source, e.g., the control switch Q16, is controlled according to the dimming signal so as to adjust the regulated power from the power converter. In one embodiment, in an analog dimming mode, the regulated power from the power converter can be adjusted by comparing the dimming signal with a feedback current monitoring signal which indicates a light source current of the light source. In another embodiment, in a burst dimming mode, the regulated power from the power converter can be adjusted by controlling a duty cycle of a PWM signal by the dimming signal.

Accordingly, embodiments in accordance with the present invention provide a light source driving circuit that can adjust power of a light source according to a switch monitoring signal indicative of an operation of a power switch, e.g., an on/off switch mounted on the wall. The power of the light source, which is provided by a power converter, can be adjusted by a dimming controller by controlling a switch coupled in series with the light source. Advantageously, as described above, users can adjust the light output of the light source through an operation (e.g., a turn-off operation) of a common on/off power switch. Therefore, extra apparatus for dimming, such as an external dimmer or a specially designed switch with adjusting buttons, can be avoided and the cost can be reduced.

Figure 10:
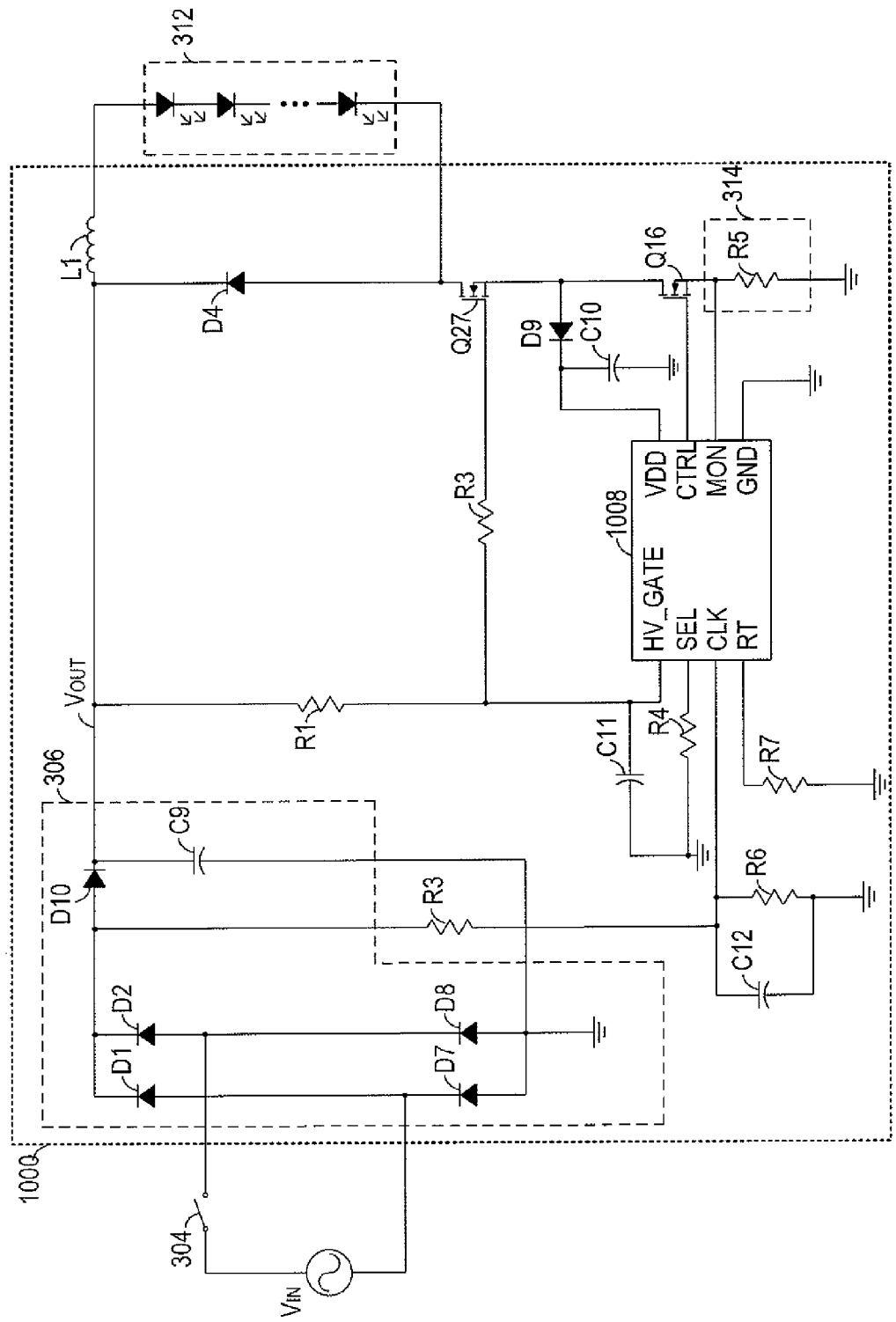
FIG. 10 shows a schematic diagram of a light source driving circuit, in accordance with one embodiment of the present invention.

FIG. 10 shows an example of a schematic diagram of a light source driving circuit 1000, in accordance with one embodiment of the present invention. FIG. 10 is described in combination with FIG. 3. Elements labeled the same as in FIG. 3 and FIG. 4 have similar functions.

The light source driving circuit 1000 includes a power converter 310 coupled to a power source and an LED string 312 for receiving power from the power source and for providing a regulated power to the LED string 312. A dimming controller 1008 is operable for monitoring a power switch 304 coupled between the power source and the light source driving circuit 1000 by monitoring the voltage at a terminal CLK. The dimming controller 1008 is operable for receiving a dimming request signal indicative of a first set of operations of the power switch 304 and for receiving a dimming termination signal indicative of a second set of operations of the power switch 304. The dimming controller 1008 can receive the dimming request signal and the dimming termination signal via the terminal CLK. The dimming controller 1008 is further operable for continuously adjusting the regulated power from the power converter 310 if the dimming request signal is received, and for stopping adjusting the regulated power from the power converter 310 if the dimming termination signal is received. In other words, the dimming controller 1008 can continuously adjust the power from the power converter 310 upon detection of the first set of operations of the power switch 304 until the second set of operations of the power switch 304 are detected. In one embodiment, the dimming controller 1008 can adjust the regulated power from the power converter 310 by controlling a control switch Q16 coupled in series with the LED string 312.

Figure 11:
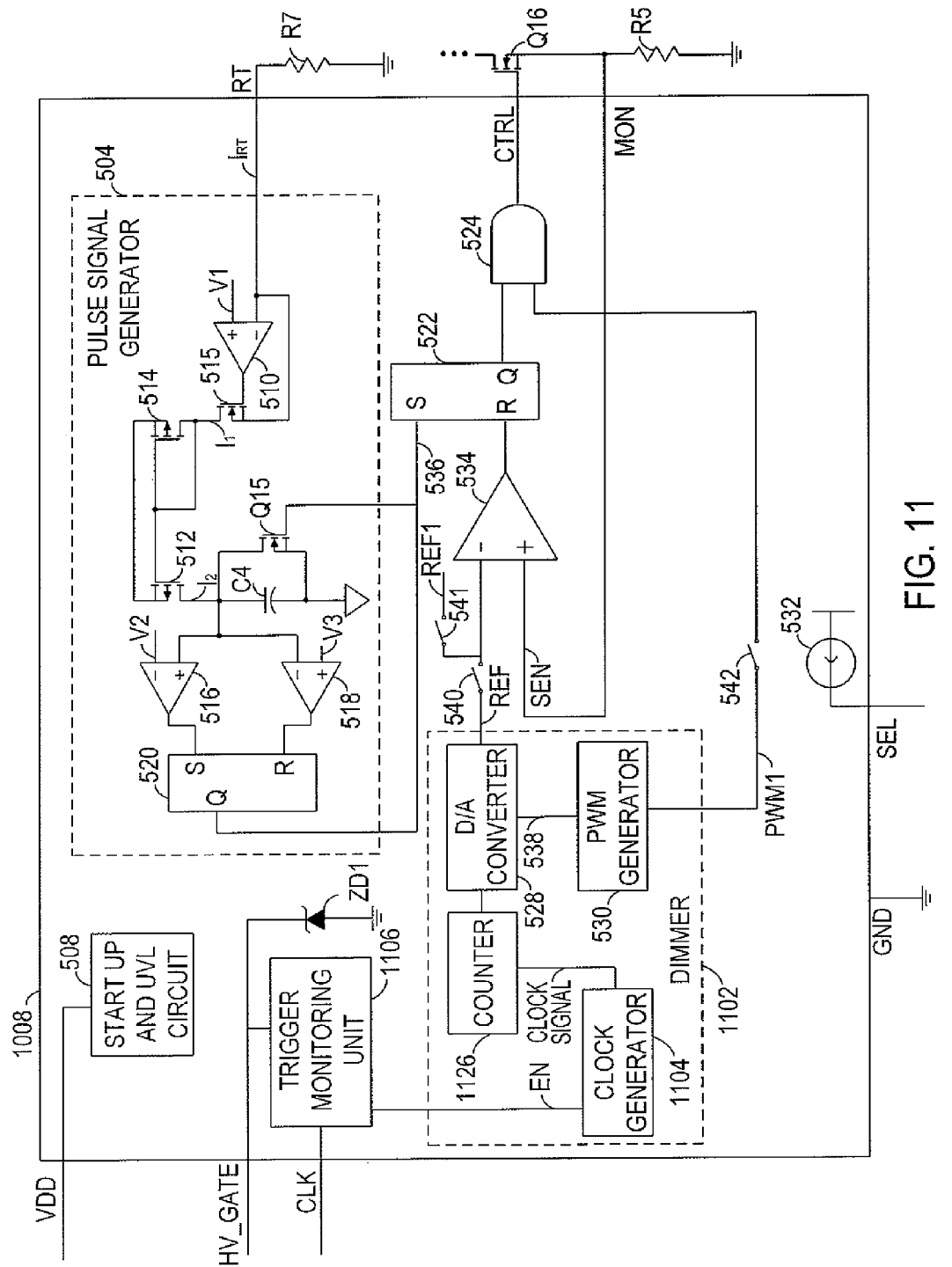
FIG. 11 shows a structure of a dimming controller in FIG. 10, in accordance with one embodiment of the present invention.

FIG. 11 shows an example of a structure of the dimming controller 1008 in FIG. 10, in accordance with one embodiment of the present invention. FIG. 11 is described in combination with FIG. 10. Elements labeled the same as in FIG. 4, FIG. 5 and FIG. 10 have similar functions.

In the example of FIG. 11, the structure of the dimming controller 1008 in FIG. 11 is similar to the structure of the dimming controller 308 in FIG. 5 except for the configuration of the dimmer 1102 and the trigger monitoring unit 1106. In FIG. 11, the trigger monitoring unit 1106 is operable for receiving the dimming request signal and the dimming termination signal via the terminal CLK, and for generating a signal EN to enable or disable a clock generator 1104. The trigger monitoring unit 1106 is further operable for controlling a conductance status of the switch Q27 coupled to the LED string 312.

The dimmer 1102 is operable for generating a reference signal REF to adjust power of the LED string 312 in an analog dimming mode, or generating a control signal 538 for adjusting a duty cycle of a PWM signal PWM1 to adjust the power of the LED string 312 in a burst dimming mode. In the example shown in FIG. 11, the dimmer 1102 can include the clock generator 1104 coupled to the trigger monitoring unit 1106 for generating a clock signal, a counter 1126 driven by the clock signal, an digital-to-analog (D/A) converter 528 coupled to the counter 1126. The dimmer 1102 can further include a PWM generator 530 coupled to the D/A converter 528.

In operation, when the power switch 304 is turned on or turned off, the trigger monitoring unit 1106 can detect a positive edge or a negative edge of the voltage at the terminal CLK. For example, when the power switch 304 is turned off, the capacitor C10 is discharged to power the dimming controller 1108. A voltage across the resistor R6 drops to zero. Therefore, a negative edge of the voltage at the terminal CLK can be detected by the trigger monitoring unit 1106. Similarly, when the power switch 304 is turned on, the voltage across the resistor R6 rises to a predetermined voltage. Therefore, a positive edge of the voltage at the terminal CLK can be detected by the trigger monitoring unit 1106. As such, operations, e.g., turn-on operations or turn-off operations, of the power switch 304 can be detected by the trigger monitoring unit 1106 by monitoring the voltage at the terminal CLK.

In one embodiment, a dimming request signal can be received by the trigger monitoring unit 1106 via the terminal CLK when a first set of operations of the power switch 304 are detected. A dimming termination signal can be received by the trigger monitoring unit 1106 via the terminal CLK when a second set of operations of the power switch 304 are detected. In one embodiment, the first set of operations of the power switch 304 includes a first turn-off operation followed by a first turn-on operation. In one embodiment, the second set of operations of the power switch 304 includes a second turn-off operation followed by a second turn-on operation.

If the dimming request signal is received by the trigger monitoring unit 1106, the dimming controller 1108 begins to continuously adjust the regulated power from the power converter 310. In an analog dimming mode, the dimming controller 1108 adjusts a voltage of a reference signal REF to adjust the regulated power from the power converter 310. In a burst dimming mode, the dimming controller 1108 adjusts a duty cycle of a PWM signal PWM1 to adjust the regulated power from the power converter 310.

If the dimming termination signal is received by the trigger monitoring unit 1106, the dimming controller 1108 can stop adjusting the regulated power from the power converter 310.

Figure 12:
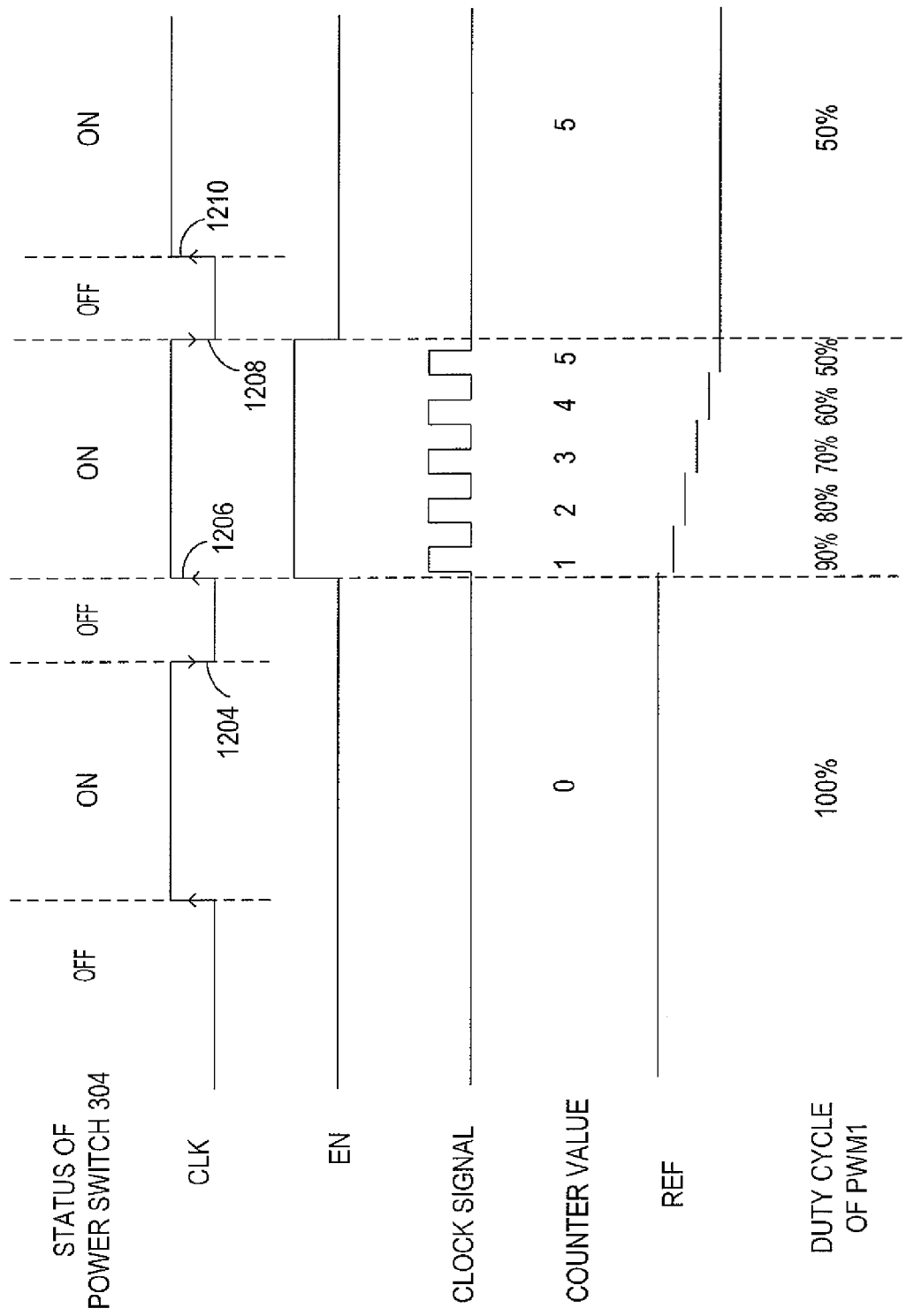
FIG. 12 illustrates a diagram illustrating an operation of a light source driving circuit which includes the dimming controller in FIG. 11, in accordance with one embodiment of the present invention.

FIG. 12 illustrates an example of a diagram illustrating an operation of a light source driving circuit which includes the dimming controller 1008 in FIG. 11, in accordance with one embodiment of the present invention. FIG. 12 is described in combination with FIG. 10 and FIG. 11.

Assume that initially the power switch 304 is off. In operation, when the power switch 304 is turned on, e.g., by a user, the LED string 312 is powered by a regulated power from the power converter 310 to generate an initial light output, in one embodiment. In the analog dimming mode, the initial light output can be determined by an initial voltage of the reference signal REF. In the burst dimming mode, the initial light output can be determined by an initial duty cycle (e.g., 100%) of the PWM signal PWM1. The reference signal REF and the PWM signal PWM1 can be generated by the D/A converter 528 according to a counter value of the counter 1126, in one embodiment. Therefore, the initial voltage of REF and the initial duty cycle of PWM1 can be determined by an initial counter value (e.g., zero) provided by the counter 1126.

In order to adjust the light output of the LED string 312, the user can apply a first set of operations to the power switch 304. A dimming request signal is generated upon detection of the first set of operations of the power switch 304. In one embodiment, the first set of operations can include a first turn-off operation followed by a first turn-on operation. As a result, a dimming request signal including a negative edge 1204 followed by a positive edge 1206 of the voltage at the terminal CLK can be detected and received by the trigger monitoring unit 1106. In response to the dimming request signal, the trigger monitoring unit 1106 can generate a signal EN having a high level. Thus, the clock generator 1104 is enabled to generate a clock signal. The counter 1126 driven by the clock signal can change the counter value in response to each clock pulse of the clock signal. In the example of FIG. 12, the counter value increases in response to the clock signal. In one embodiment, the counter value can be reset to zero after the counter 1126 reaches its predetermined maximum counter value. In another embodiment, the counter value increases until the counter 1126 reaches its predetermined maximum counter value, and then decreases until the counter 1126 reaches its predetermined minimum counter value.

In the analog dimming mode, the D/A converter 528 reads the counter value from the counter 1126 and decreases the voltage of the reference signal REF in response to an increase of the counter value, in one embodiment. In the burst dimming mode, the D/A converter 528 reads the counter value from the counter 1126 and decreases the duty cycle of the PWM signal PWM1 (e.g., decreases 10% each time) in response to an increase of the counter value, in one embodiment. Accordingly, the light output of the LED string 312 can be adjusted because the regulated power from the power converter 310 can be determined by the voltage of the reference signal REF (in the analog dimming mode) or by the duty cycle of the PWM signal PWM1 (in the burst dimming mode).

Once a desired light output has been achieved, the user can terminate the adjustment process by applying a second set of operations to the power switch 304. A dimming termination signal is generated upon detection of the second set of operations of the power switch 304. In one embodiment, the second set of operations can include a second turn-off operation followed by a second turn-on operation. As a result, the dimming termination signal including a negative edge 1208 followed by a positive edge 1210 of the voltage at the terminal CLK can be detected and received by the trigger monitoring unit 1106. Upon detection of the dimming termination signal, the trigger monitoring unit 1106 can generate the signal EN having a low level. Thus, the clock generator 1104 is disabled, such that the counter 1126 can hold its counter value. Accordingly, in the analog dimming mode, the voltage of the reference signal REF can be held at a desired level. In the burst dimming mode, the duty cycle of the PWM signal PWM1 can be held at a desired value. Therefore, the light output of the LED string 312 can be maintained at a desired light output.

Figure 13:
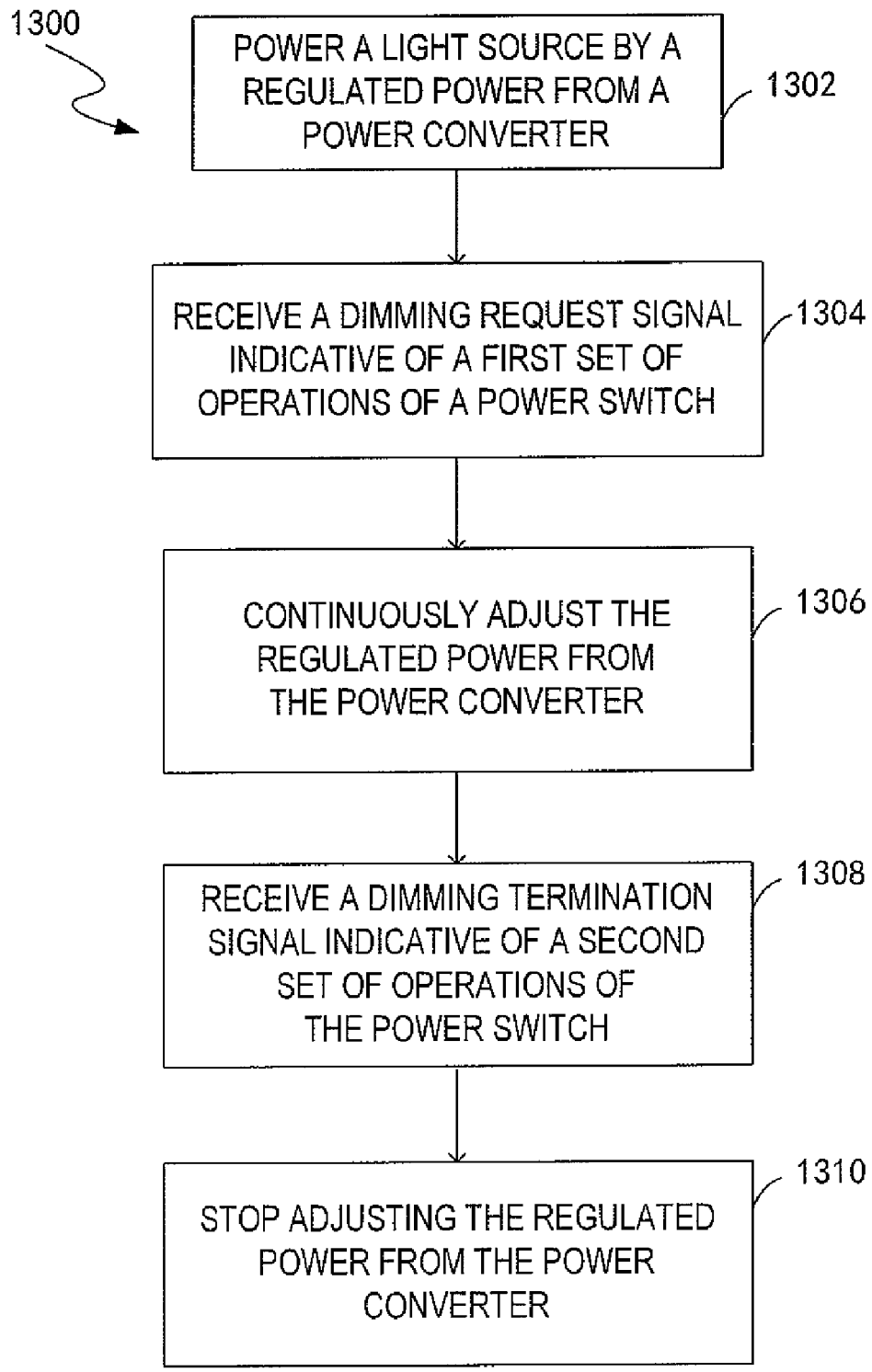
FIG. 13 shows a flowchart of a method for adjusting power of a light source, in accordance with one embodiment of the present invention.

FIG. 13 shows a flowchart 1300 of a method for adjusting power of a light source, in accordance with one embodiment of the present invention. FIG. 13 is described in combination with FIG. 10 and FIG. 11.

In block 1302, a light source, e.g., the LED string 312, is powered by a regulated power from a power converter, e.g., the power converter 310.

In block 1304, a dimming request signal can be received, e.g., by the dimming controller 1108. The dimming request signal can indicate a first set of operations of a power switch, e.g., the power switch 304 coupled between a power source and the power converter. In one embodiment, the first set of operations of the power switch includes a first turn-off operation followed by a first turn-on operation.

In block 1306, the regulated power from the power converter is continuously adjusted, e.g., by the dimming controller 1108. In one embodiment, a clock generator 1104 can be enabled to drive a counter 1126. A dimming signal (e.g., control signal 538 or reference signal REF) can be generated according to the counter value of the counter 1126. In an analog dimming mode, the regulated power from the power converter can be adjusted by comparing the reference signal REF with a feedback current monitoring signal which indicates a light source current of the light source. The voltage of REF can be determined by the counter value. In a burst dimming mode, the regulated power from the power converter can be adjusted by varying a duty cycle of a PWM signal PWM1 by the control signal 538. The duty cycle of PWM1 can be also determined by the counter value.

In block 1308, a dimming termination signal can be received, e.g., by the dimming controller 1108. The dimming termination signal can indicate a second set of operations of a power switch, e.g., the power switch 304 coupled between a power source and the power converter. In one embodiment, the second set of operations of the power switch includes a second turn-off operation followed by a second turn-on operation.

In block 1310, the adjustment of the regulated power from the power converter is terminated if the dimming termination signal is received. In one embodiment, the clock generator 1104 is disabled such that the counter 1126 can hold its counter value. As a result, in the analog dimming mode, the voltage of REF can be held at a desired level. In the burst dimming mode, the duty cycle of the PWM signal PWM1 can be held at a desired value. Consequently, the light source can maintain a desired light output.

Figure 14A:
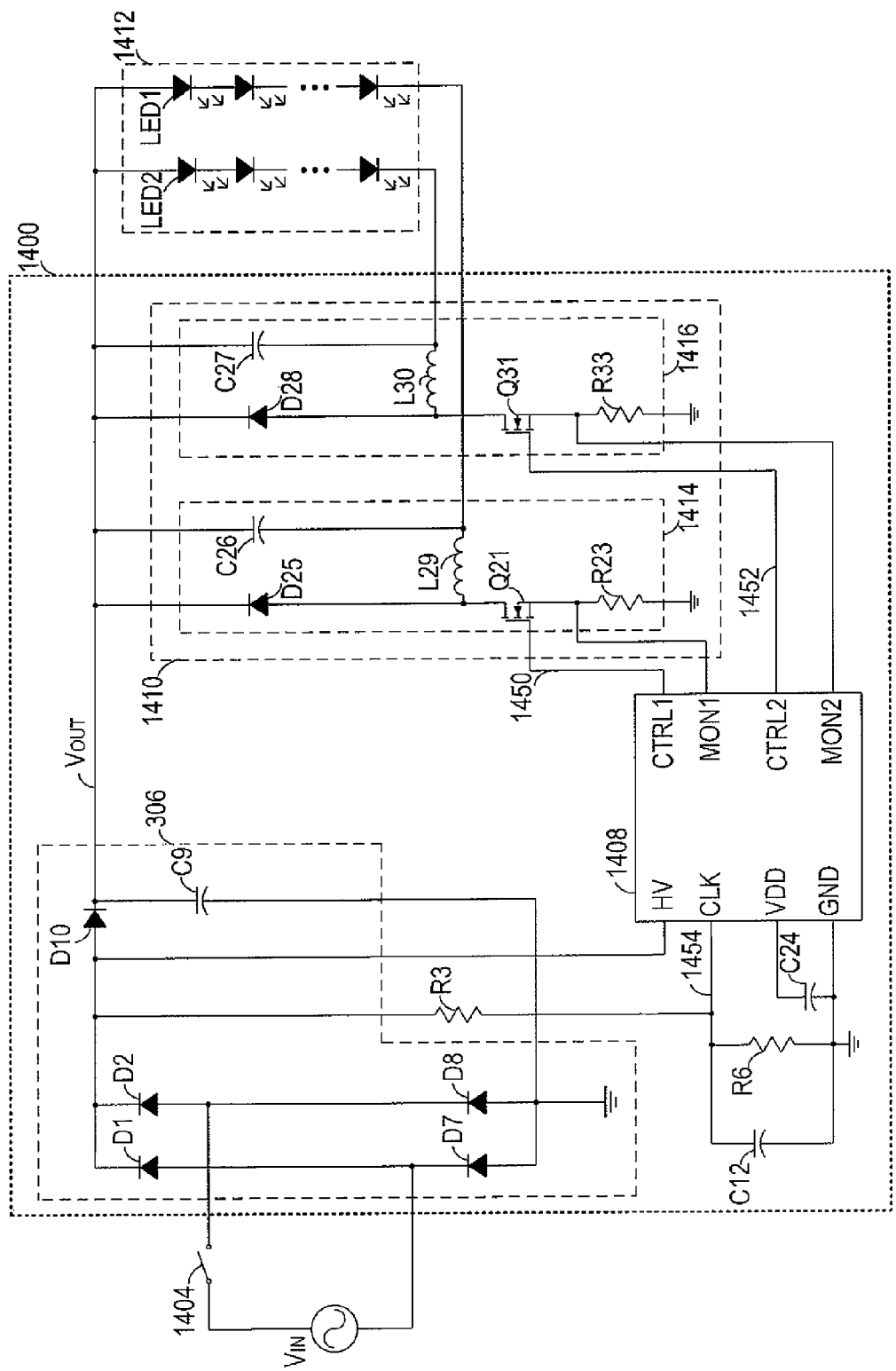
FIG. 14A shows an example of a schematic diagram of a light source driving circuit, in accordance with one embodiment of the present invention.

FIG. 14A shows an example of a schematic diagram of a light source driving circuit 1400, in accordance with one embodiment of the present invention. Elements labeled the same as in FIG. 3, FIG. 4 and FIG. 10 have similar functions. FIG. 14A is described in combination with FIG. 4.

Figure 14B:
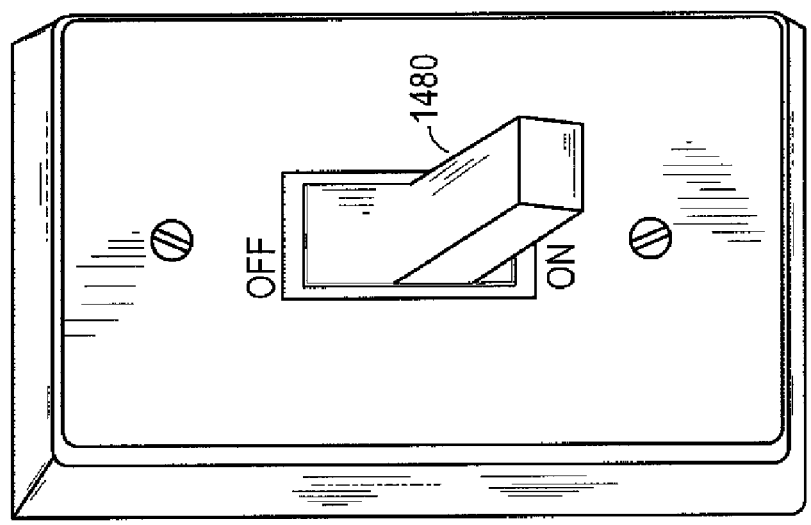
FIG. 14B shows an example of a power switch in FIG. 14A, in accordance with one embodiment of the present invention.
Figure 14B:
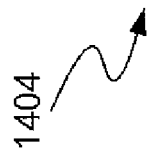

The light source driving circuit 1400 is coupled to a power source $V_{IN}$ (e.g., 110/120 Volt AC, 60 Hz) via a power switch 1404 and is coupled to a light source 1412. Referring to FIG. 14B, an example of the power switch 1404 in FIG. 14A is illustrated according to one embodiment of the present invention. In one embodiment, the power switch 1404 is an on/off switch mounted on the wall. By switching a button 1480 to an ON place or an OFF place, the conductance status of the power switch 1404 is controlled on or off, e.g., by a user.

Referring back to FIG. 14A, the light source driving circuit 1400 includes an AC/DC converter 306, a converter 1410, and a dimming controller 1408. The AC/DC converter 306 converts an input AC voltage $V_{IN}$ to an output DC voltage $V_{OUT}$. The converter 1410 coupled to the AC/DC converter 306 receives the output DC voltage $V_{OUT}$ and provides output power to a light source 1412. The dimming controller 1408 coupled to the AC/DC converter 306 and coupled to the converter 1410 is operable for monitoring the power switch 1404, and for regulating the output power of the converter 1410 according to operations of the power switch 1404 so as to control the color and brightness of light emitted from the light source 1412. In one embodiment, the dimming controller 1408 includes multiple terminals, such as a terminal HV, a terminal CLK, a terminal VDD, a terminal GND, a terminal CTRL1, a terminal MON1, a terminal CTRL2, and a terminal MON2.

In one embodiment, the light source 1412 further includes multiple LED light sources, for example, a light source LED1 and a light source LED2. For illustrative purposes, FIG. 14A shows that the light source LED1 includes an LED string and the light source LED2 includes an LED string. Alternatively, the light source LED1 and the light source LED2 each can include multiple LED strings. The light source LED1 is capable of emitting light having a first color, e.g., a warm color. The light source LED2 is capable of emitting light having a second color, e.g., a cool color. Therefore, the light source 1412 is capable of emitting light with different colors by controlling the light source LED1 and light source LED2.

In one embodiment, the converter 1410 further includes power converters 1414 and 1416 coupled to the light sources LED1 and LED2, respectively. The power converter 1414 can be a buck converter including an inductor L29, a diode D25, a capacitor C26, a resistor R23, and a control switch Q21. The control switch Q21 coupled in series with the light source LED1 is turned on and off according to a switch control signal 1450, e.g., a pulse-width modulation signal. Similarly, the power converter 1416 can also be a buck converter including an inductor L30, a diode D28, a capacitor C27, a resistor R33, and a control switch Q31. The control switch Q31 coupled in series with the light source LED2 is turned on and off according to a switch control signal 1452, e.g., a pulse-width modulation signal. The power converters 1414 and 1416 can have other configurations and are not limited to the example in FIG. 14A.

Similar to the operations of the power converter 310 (shown in FIG. 4), the power converter 1414 delivers the regulated power to the light source LED1 according to a conductance status of the control switch Q21. More specifically, in one embodiment, the control switch Q21 is turned on or Q21 is alternately turned on and off (referred to as the "light-on" state) to enable a current flowing through the light source LED1. The power converter 1414 can operate in a burst dimming mode or an analog dimming mode to adjust a power level of the regulated power. For example, in the burst dimming mode, a duty cycle of the switch control signal 1450 is adjusted to regulate the power provided to the light source LED1. In the analog dimming mode, a peak level of the current flowing through the light source LED1 is adjusted according to the switch control signal 1450 to regulate the power to the light source LED1.

Furthermore, if the control switch Q21 is turned off and the OFF state lasts longer than a time threshold (referred to as the "light-off" state), the current flowing through the light source LED1 drops to substantially zero ampere and thus the light source LED1 is cut off. The power converter 1416 operates similarly to the power converter 1414.

Based on the switch control signals 1450 and 1452, the converter 1410 selectively delivers the regulated power to the light sources LED1 and LED2. In one embodiment, one of the control switches Q21 and Q31 is in the light-on state to power on a corresponding light source LED1 or LED2, and the other control switch is in the light-off state to cut off a corresponding light source LED1 or LED2. For example, when LED1 (e.g., a warm color white LED string) is powered on and LED2 (e.g., a cool color white LED string) is cut off, the light source 1412 emits light with a warm color temperature. Likewise, when LED1 is cut off and LED2 is powered on, the light source 1412 emits light with a cool color temperature.

Thus, by regulating the power delivered to the light source 1412, e.g., via the switch control signals 1450 and 1452, both the light color and the light brightness of the light source 1412 is controlled.

The dimming controller 1408 is operable for monitoring operations of the power switch 1404 and for generating the switch control signals 1450 and 1452 accordingly. The terminal HV coupled to the AC/DC converter 306 receives power from the power source $V_{IN}$ to power the dimming controller 1408 when the power switch 1404 is turned on. In one embodiment, an energy storage unit, e.g., a capacitor C24, coupled to the terminal VDD can power the dimming controller 1408 when the power switch 1404 is turned off. The terminal GND is coupled to ground.

In one embodiment, the terminal MON1 is coupled to the resistor R23 and for monitoring the current flowing through the light source LED1. Likewise, the terminal MON2 is coupled to the resistor R33 and for monitoring the current flowing through the light source LED2.

In the example of FIG. 14A, the dimming controller 1408 monitors the power switch 1404 by detecting a voltage at the terminal CLK which is coupled to the AC/DC converter 306. Through the terminal CLK, the dimming controller 1408 receives a color change signal indicative of a first set of operations of the power switch 1404, a dimming request signal indicative of a second set of operations of the power switch 1404, and a dimming termination signal indicative of a third set of operations of the power switch 1404. According to the signal received at the terminal CLK, the dimming controller 1408 generates the switch control signals 1450 and 1452 to control the control switches Q21 and Q31 respectively.

If a color change signal is received, the dimming controller 1408 changes the conductance states of the switches Q21 and Q31 such that the light color of the light source 1412 is changed. By way of example, when the light of the light source 1412 has a warm color temperature (e.g., Q21 is in the light-on state and Q31 is in the light-off state), the dimming controller 1408 switches Q21 and Q31 to the light-off state and the light-on state, respectively. As such, the light color is switched to a cool color temperature. Likewise, if the color change signal is received when the light of the light source 1412 has a cool color temperature (e.g., Q21 is in the light-off state and Q31 is in the light-on state), the dimming controller 1408 switches Q21 and Q31 to the light-on state and the light-off state, respectively. As such, the light color is switched to a warm color temperature.

If a dimming request signal is received, the dimming controller 1408 adjusts the brightness of the light source 1412 accordingly. By way of example, when the light of the light source 1412 has a warm color temperature (e.g., Q21 is in the light-on state and Q31 is in the light-off state), the dimming controller 1408 controls Q21 in the burst dimming mode or the analog dimming mode to increase or decrease the power to the light source 1412 for a predetermined time period (e.g., $T_{TH2}$) or until a dimming termination signal is received. Likewise, when the light of the light source 1412 has a cool color temperature (e.g., Q31 is in the light-on state and Q21 is in the light-off state), the dimming controller 1408 controls Q31 in the burst dimming mode or the analog dimming mode to increase or decrease the power to the light source 1412 for a predetermined time period (e.g., $T_{TH2}$) or until a dimming termination signal is received.

Advantageously, a user can control light color by applying the first set of operations to the power switch 1404. The user can also control light brightness by applying the second set of operations to the same power switch 1404 such that the brightness of the light source 1412 gradually decreases or increases. If a desired brightness has been achieved, the user can terminate the brightness adjustment by applying the third set of operations to the power switch 1404. Therefore, extra apparatus for color selection and light dimming, such as an external remote controller or a specially designed switch with adjusting buttons, are avoided and thus the cost is reduced.

Figure 15:
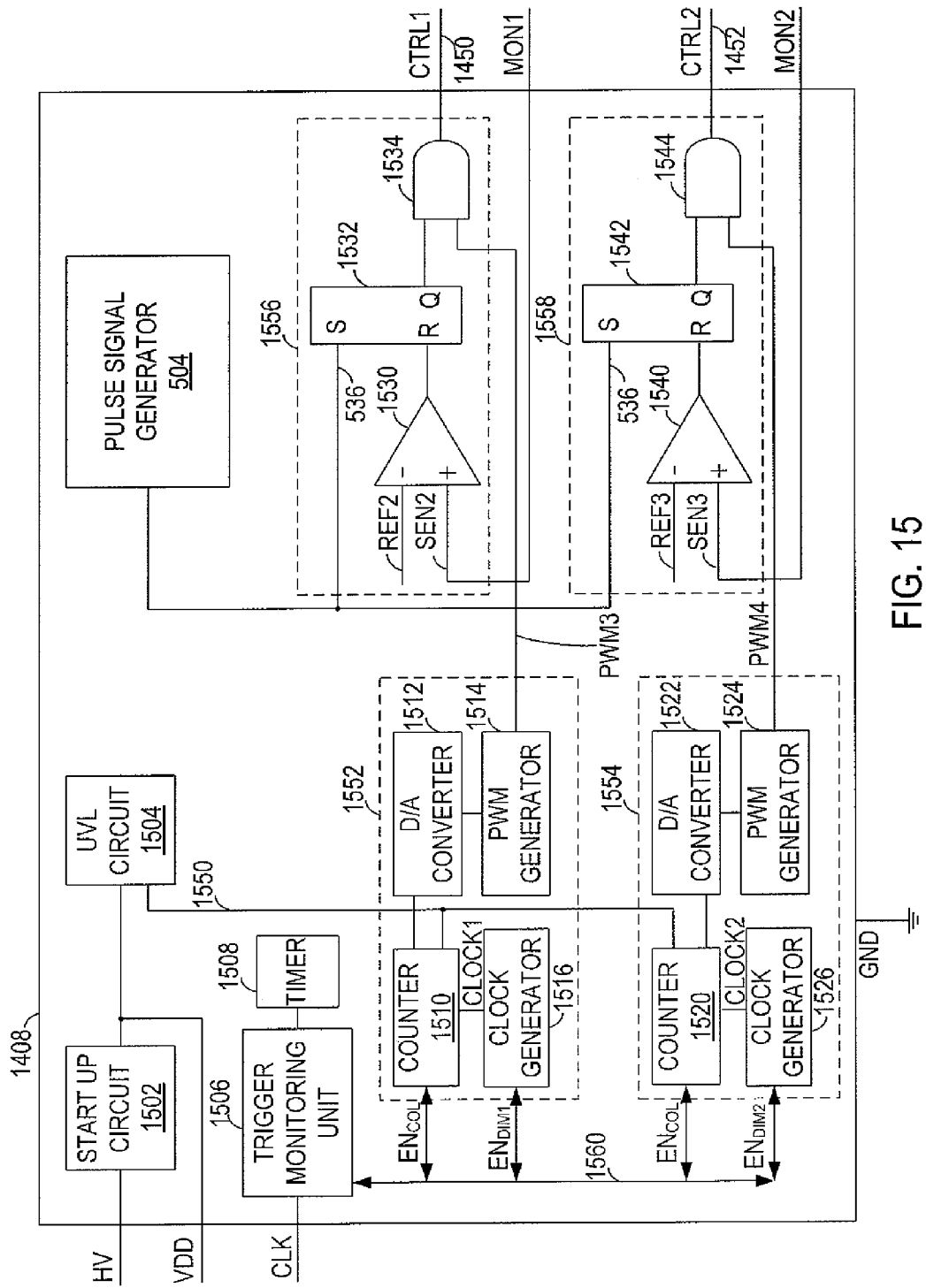
FIG. 15 shows an example of a structure of a dimming controller in FIG. 14A, in accordance with one embodiment of the present invention.

FIG. 15 shows an example of a structure of the dimming controller 1408 in FIG. 14A, in accordance with one embodiment of the present invention. FIG. 15 is described in combination with FIG. 5 and FIG. 14A. Elements labeled the same as in FIG. 5, FIG. 11 and FIG. 14A have similar functions.

In the example of FIG. 15, the dimming controller 1408 includes a start-up circuit 1502, an under-voltage-lockout (UVL) circuit 1504, a trigger monitoring unit 1506, dimmers 1552 and 1554, a pulse signal generator 504, and logic circuits 1556 and 1558. The start-up circuit 1502 receives power from the terminal HV and provides a supply voltage to the terminal VDD when the power switch 1404 is turned on. The UVL circuit 1504 coupled to the terminal VDD is operable for detecting the supply voltage and controlling the dimming controller 1408 according to the supply voltage. In one embodiment, when the power switch 1404 is on, the UVL circuit 1504 turns on the dimming controller 1408. When the power switch 1404 remains off for a duration less than a time threshold $T_{TH\_VDD}$, the capacitor C24 (shown in FIG. 14A) is discharged to provide power to the terminal VDD. Thus, the dimming controller 1408 can still be powered on to operate. If, however, the power switch 1404 remains off for a duration greater than $T_{TH\_VDD}$, the voltage at the terminal VDD drops below a predetermined threshold $V_{THL}$. As such, the UVL circuit 1504 turns off the dimming controller 1408.

As described in relation to FIG. 14A, the color change signal indicates the first set of operations of the power switch 1404, the dimming request signal indicates the second set of operations of the power switch 1404, and the dimming termination signal indicates the third set of operations of the power switch 1404. In one embodiment, the first set of operations includes a first turn-off operation followed by a first turn-on operation. The second set of operations includes a second turn-off operation followed by a second turn-on operation. A first time interval between the first turn-off operation and the first turn-on operation is different from a second time interval between the second turn-off operation and the second turn-on operation, in one embodiment. For example, the first time interval is greater than a time threshold $T_{TH1}$, e.g., 2 seconds, and the second time interval is less than $T_{TH1}$.

Additionally, the third set of operations includes a third turn-off operation followed by a third turn-on operation. The third turn-off operation follows the second turn-on operation and a time interval between the second turn-on operation and the third turn-off operation is less than a second time threshold $T_{TH2}$, e.g., 10 second, in one embodiment.

The trigger monitoring circuit 1506 coupled to the terminal CLK is operable for receiving a detection signal indicating the conductance status of the power switch 1404 via the terminal CLK. Based upon the detection signal, the trigger monitoring unit 1506 determines whether the power switch 1404 performs a turn-on operation or a turn-off operation. By cooperating with a timer 1508, the trigger monitoring circuit 1506 measures a time interval between different operations of the power switch 1404, e.g., between a turn-on operation and a turn-off operation or between a turn-on operation and another turn-on operation. Consequently, the trigger monitoring unit 1506 identifies the color change signal, the dimming request signal and the dimming termination signal.

The dimmer 1552 includes a counter 1510, a D/A converter 1512, a PWM generator 1514, and a clock generator 1516. Similar to the operations of the dimmer 1102 in FIG. 11, the dimmer 1552 generates a dimming signal PWM3 according to a counter value stored in the counter 1510. In one embodiment, the duty cycle of the dimming signal PWM3 is determined by the counter value. The logic circuit 1556 coupled to the dimmer 1552 includes a comparator 1530, an SR flip-flop 1532, and an AND gate 1534. Similar to the operations of circuitry including the comparator 534, the SR flip-flop 522, and the AND gate 524 (shown in FIG. 5), the logic circuit 1556 generates the switch control signal 1450 at the terminal CTRL1 according to the dimming signal PWM3. The duty cycle of the switch control signal 1450 is determined by the counter value of the counter 1510, in one embodiment. Thus, the power to the light source LED1 is regulated by controlling the control switch Q21 based upon the switch control signal 1450.

Similarly, the dimmer 1554 includes a counter 1520, a D/A converter 1522, a PWM generator 1524, and a clock generator 1526, and is operable for generating a dimming signal PWM4. The logic circuit 1558 coupled to the dimmer 1554 includes a comparator 1540, an SR flip-flop 1542, and an AND gate 1544, and is operable for generating the switch control signal 1452. The duty cycle of the dimming signal PWM4 and the switch control signal 1452 can be determined by the counter value of the counter 1520. Thus, the power of the light source LED2 is adjusted by controlling the control switch Q31 based upon the switch control signal 1452.

TABLE 1

| | COUNTER VALUE | | | | | | | | | | |
|---|---|---|---|---|---|---|---|---|---|---|---|
| | 0 | 1 | 2 | 3 | 4 | 5 | 6 | 7 | 8 | 9 | 10 |
| DUTY CYCLE | 0 | 10% | 20% | 30% | 40% | 50% | 60% | 70% | 80% | 90% | 100% |

Table 1 shows an example of the counter value of the counter 1510 or 1520 versus the duty cycle of the corresponding switch control signal 1450 or 1452, in accordance with one embodiment of the present invention. As shown in Table 1, if the counter value is set to 0, the duty cycle is 0 and thus the corresponding control switch Q21 or Q31 operates in the light-off state to cut off the corresponding LED light source. If the counter value is greater than 0, e.g., 1-10, the duty cycle is greater than 0 and thus the corresponding control switch Q21 or Q31 operates in the light-on state to power on the corresponding LED light source.

The UVL circuit 1504 detects the supply voltage at the terminal VDD. In one embodiment, the UVL circuit 1504 is capable of adjusting the counter values in the counters 1510 and 1520 according to the supply voltage at the terminal VDD. More specifically, the UVL circuit 1504 sets the counter values in the counters 1510 and 1520 to a first set of predetermined values when the supply voltage at the terminal VDD drops below the voltage threshold $V_{THL}$, and sets the counter values in the counters 1510 and 1520 to a second set of predetermined values when the supply voltage at the terminal VDD rises above $V_{THL}$. For example, when the supply voltage drops below the voltage threshold $V_{THL}$, the counter value in the counter 1510 is set to 0 and the counter value in the counter 1520 is set to 0. Thus, both the LED strings LED1 and LED2 are cut off. When the supply voltage rises above $V_{THL}$, the counter values in the counter 1510 and in the counter 1520 can be set to 10 and 0 respectively. Thus, LED1 is powered on and LED2 is cut off.

In one embodiment, the dimming controller 1408 further includes a bus 1560 for interconnecting the dimmer 1552, the dimmer 1554, and the trigger monitoring unit 1506. The trigger monitoring unit 1506 generates enable signals $EN_{COL}$, $EN_{DIM1}$ and $EN_{DIM2}$ to adjust the counter values of the counters 1510 and 1520, in one embodiment.

More specifically, in one embodiment, when a color change signal is received, the trigger monitoring unit 1506 generates an enable signal $EN_{COL}$, which is transferred to both the counter 1510 and the counter 1520 via the bus 1560. In response, the counter values of the counters 1510 and 1520 are exchanged, in one embodiment. For example, if the counters 1510 and 1520 have values 5 and 0 respectively, indicating that the light source 1412 (LED1 is on and LED2 is off) emits light with a warm color temperature, the counter values in the counters 1510 and 1520 are changed to 0 and 5 respectively in response to the enable signal $EN_{COL}$. Thus, the light emitted from the light source (LED1 is off and LED2 is on) is changed to a cool color temperature. Advantageously, the color is changed but the brightness level of the light still remains the same. Alternatively, the counter values of the counters 1510 and 1520 can be changed to other values. For example, the counter values of the counters 1510 and 1520 can be set to 0 and 10. In this circumstance, both the light color and the light brightness are changed.

If a dimming request signal is received, the trigger monitoring unit 1506 monitors the counter values to determine which control switch is in the light-on state and generates an active enable signal $EN_{DIM1}$ to control the control switch which is in the light-on state, in one embodiment. By way of example, if the control switch Q21 is in the light-on state, the clock generator 1516 provides a clock signal CLOCK1 to the counter 1510 in response to the active enable signal $EN_{DIM1}$. As such, the counter 1510 adjust the counter value to adjust the brightness of LED1. For example, the counter value can be continuously increased, and thus the brightness of LED1 is gradually increased. If a dimming termination signal is received or the brightness has been adjusted over a predetermined time period, the trigger monitoring unit 1506 generates an inactive enable signal $EN_{DIM1}$. As such, the clock signal CLOCK1 is terminated and the counter 1510 stops adjusting the counter value. Thus, the brightness adjustment is completed.

Thus, by adjusting counter values of the counters 1510 and 1520, the power to the light source 1412 is regulated to achieve a color change and brightness adjustment.

Figure 16:
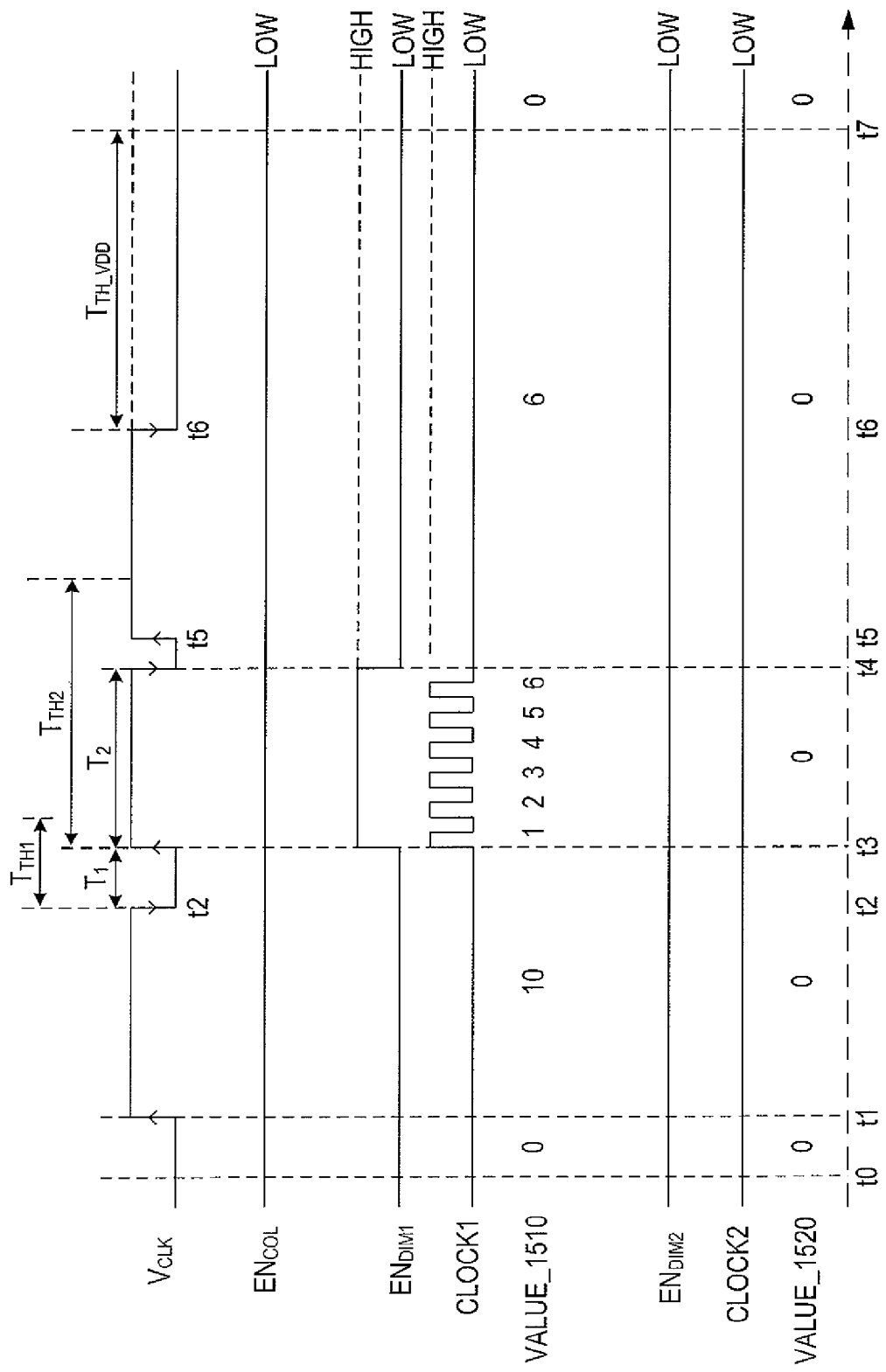
FIG. 16 illustrates an example of a diagram illustrating an operation of a light source driving circuit which includes the dimming controller in FIG. 15, in accordance with one embodiment of the present invention.

FIG. 16 illustrates an example of a diagram illustrating an operation of a light source driving circuit which includes the dimming controller 1408 in FIG. 15, in accordance with one embodiment of the present invention. FIG. 16 is described in combination with FIG. 14A and FIG. 15. FIG. 16 shows the voltage $V_{CLK}$ at the terminal CLK, the enable signals $EN_{COL}$, $EN_{DIM1}$ and $EN_{DIM2}$ generated by the trigger monitoring unit 1506, the clock signals CLOCK1 and CLOCK2, and the counter values VALUE_1510 and VALUE_1520 of the counters 1510 and 1520. The example of FIG. 16 shows how the brightness of the light source 1412 is adjusted.

At time t0, the voltage $V_{CLK}$ has a low electric level, indicating that the power switch 1404 is turned off. In one embodiment, the counter values VALUE_1510 and VALUE_1520 are both 0. Thus, both the control switches Q21 and Q31 are in the light-off state such that LED1 and LED2 are cut off.

At time t1, the power switch 1404 is turned on. The terminal HV receives power from the AC/DC converter 306. Then, the voltage at the terminal VDD rises above $V_{THL}$. In one embodiment, the UVL circuit 1504 sets VALUE_1510 and VALUE_1520 to 10 and 0 respectively. Thus, Q21 is switched to the light-on state and Q31 remains in the light-off state. Accordingly, the light source 1412 emits light having a warm color temperature at time t1.

At time t2, the voltage $V_{CLK}$ has a falling edge indicating a turn-off operation of the power switch 1404. At time t3, $V_{CLK}$ has a rising edge indicating a turn-on operation of the power switch 1404. Since the time interval T1 between t2 and t3 is less than the first time threshold $T_{TH1}$, the trigger monitoring unit 1506 identifies that a dimming request signal is received. Therefore, at time t3, the trigger monitoring unit 1506 generates an active enable signal $EN_{DIM1}$, which enables the clock generator 1516 to generate the clock signal CLOCK1. In the example of FIG. 16, the counter value VALUE_1510 increases, e.g., from 1 to 6, to gradually increase the brightness of the light source 1412.

At time t4, a falling edge of $V_{CLK}$ indicating a turn-off operation of the power switch 1404 is detected. At time t5, a rising edge of $V_{CLK}$ indicating a turn-on operation of the power switch 1404 is detected. Since the time interval T2 between t3 and t4 is less than the second threshold $T_{TH2}$, the trigger monitoring unit 1506 identifies that a dimming termination signal is received. Accordingly, the enable signal $EN_{DIM1}$ becomes inactive, e.g., a low electric level, and the clock signal CLOCK1 is terminated. Thus, the counter value VALUE_1510 maintains at 6 from time t5 to maintain the light brightness.

At time t6, $V_{CLK}$ has a falling edge indicating an turn-off operation of the power switch 1404. The time period when the power switch 1404 is off, e.g., from t6 to t7, reaches the time threshold $T_{TH\_VDD}$, which indicates that the supply voltage at terminal VDD drops below $V_{TH\_VDD}$. In response, the UVL circuit 1504 sets VALUE_1510 and VALUE_1520 both to 0 again, in one embodiment. As such, the light source 1412 is cut off at time t7.

Figure 17:
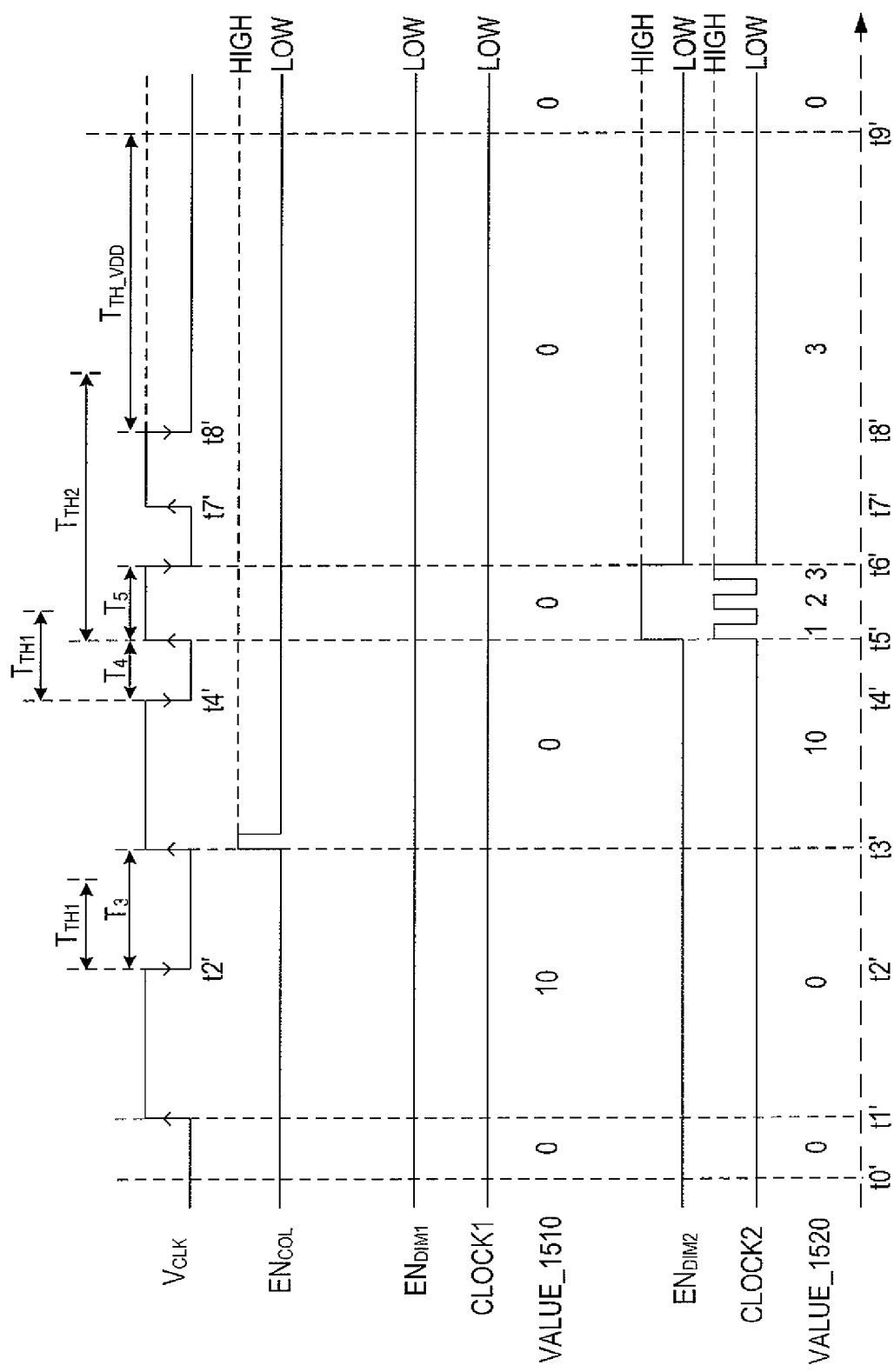
FIG. 17 illustrates another example of a diagram illustrating an operation of a light source driving circuit which includes the dimming controller in FIG. 15, in accordance with one embodiment of the present invention.

FIG. 17 illustrates another example of a diagram illustrating an operation of a light source driving circuit which includes the dimming controller 1408 in FIG. 16, in accordance with one embodiment of the present invention. FIG. 17 is described in combination with FIG. 14A and FIG. 15. FIG. 17 shows the voltage $V_{CLK}$ at the terminal CLK, the enable signals $EN_{COL}$, $EN_{DIM1}$ and $EN_{DIM2}$ generated by the trigger monitoring unit 1506, the clock signals CLOCK1 and CLOCK2, and the counter values VALUE_1510 and VALUE_1520 of the counters 1510 and 1520. The example of FIG. 17 shows how the color and the brightness of the light source 1412 are adjusted.

At time t0', the voltage $V_{CLK}$ has a low electric level, which indicates that the power switch 1404 is turned off. The counter values VALUE_1510 and VALUE_1520 are both 0. Thus, both the control switches Q21 and Q31 are in the light-off state such that LED1 and LED2 are cut off.

At time t1', the power switch 1404 is turned on. The UVL circuit 1504 sets VALUE_1510 and VALUE_1520 to 10 and 0 respectively. Thus, Q21 is switched to the light-on state and Q31 remains in the light-off state. Accordingly, the light source 1412 emits light having a warm color temperature.

The voltage $V_{CLK}$ has a falling edge at time t2' and has a rising edge at time t3', which indicates a turn-off operation at t2' followed by a turn-on operation at t3'. The time interval T3 between t2' and t3' is greater than the first time threshold $T_{TH1}$, which indicates that a color change signal is received. Therefore, at time t3', the trigger monitoring unit 1506 generates an active enable signal $EN_{COL}$, e.g., a pulse signal, to exchange the values stored in the counter 1510 and 1520, in one embodiment. As a result, VALUE_1510 and VALUE_1520 are set to 0 and 10 respectively. Accordingly, Q21 is switched to the light-off state and Q31 is switched to the light-on state, such that the color of the light source 1412 is changed to a cool color temperature and the brightness of the light source 1412 still maintains at t3'.

The voltage $V_{CLK}$ has a falling edge at time t4' and has a rising edge at time t5', which indicates a turn-off operation at t4' followed by a turn-on operation at t5'. The time interval T4 between t4' and t5' is less than $T_{TH1}$, which indicates that a dimming request signal is received. In response, the trigger monitoring unit 1506 generates the active enable signal $EN_{DIM2}$. Accordingly, the clock signal CLOCK2 is generated and the counter value VALUE_1520 increases, e.g., from 1 to 3, to gradually increase the brightness of the light source 1412.

$V_{CLK}$ has a falling edge at t6' and has a rising edge at t7', which indicates a turn-off operation at t6' followed by a turn-on operation at t7'. As the time interval T5 between t5' and t6' is less than $T_{TH2}$, the trigger monitoring unit 1506 identifies that a dimming termination signal is received. In response, the enable signal $EN_{DIM2}$ becomes inactive, and the clock signal CLOCK2 is terminated. Thus, the counter value VALUE_1510 maintains at 3 from time t7' to maintain the light brightness.

At time t8', $V_{CLK}$ has a falling edge indicating a turn-off operation of the power switch 1404. The time period when the power switch 1404 is off, e.g., from t8' to t9', reaches the time threshold $T_{TH\_VDD}$, which indicates that the supply voltage at terminal VDD drops below $V_{TH\_VDD}$. Then, the UVL circuit 1504 can set VALUE_1510 and VALUE_1520 both to 0 again, in one embodiment. As such, the light source 1412 is cut off at time t9'.

Figure 18:
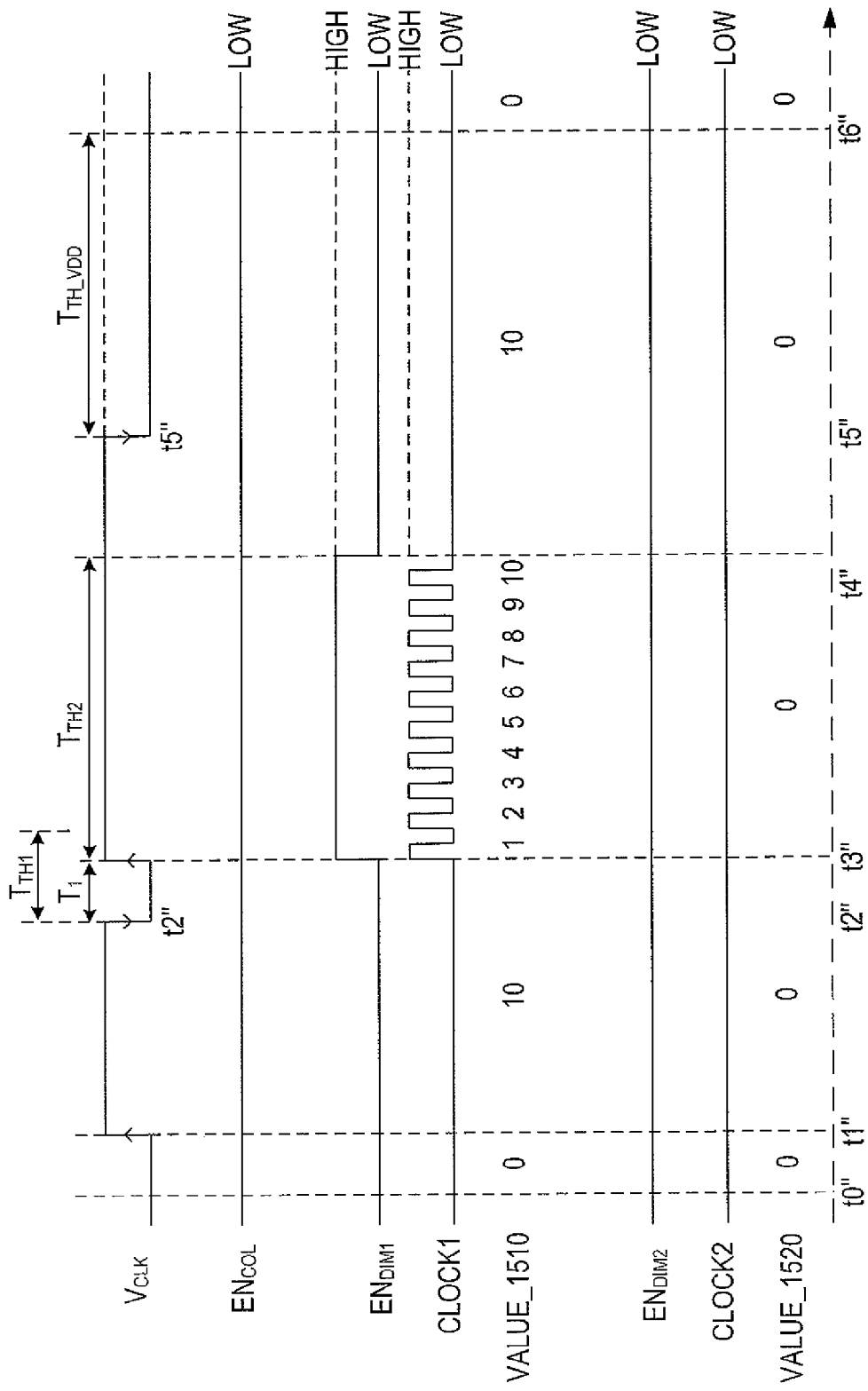
FIG. 18 illustrates another example of a diagram illustrating an operation of a light source driving circuit which includes the dimming controller in FIG. 15, in accordance with one embodiment of the present invention.

FIG. 18 illustrates another example of a diagram illustrating an operation of a light source driving circuit which includes the dimming controller 1408 in FIG. 15, in accordance with one embodiment of the present invention. FIG. 18 is described in combination with FIG. 14A and FIG. 15. FIG. 18 shows the voltage $V_{CLK}$ at the terminal CLK, the enable signals $EN_{COL}$, $EN_{DIM1}$ and $EN_{DIM2}$ generated by the trigger monitoring unit 1506, the clock signals CLOCK1 and CLOCK2, and the counter values VALUE_1510 and VALUE_1520 of the counters 1510 and 1520. The example of FIG. 18 shows how the brightness of the light source 1412 is adjusted.

During the time interval between t0" and t3", the dimming controller 1408 operates similarly to the operation from t0 to t3 as described in relation to FIG. 16. For example, a turn-off operation at time t2" followed by a turn-on operation at time t3" is identified as a dimming request signal. As such, VALUE_1510 is adjusted starting at time t3". At time t4", the brightness has been adjusted for a predetermined time period $T_{TH2}$. As such, the trigger monitoring unit 1506 generates an inactive enable signal $EN_{DIM1}$. The clock signal CLOCK1 is terminated. Therefore, VALUE_1510 maintains at 10 from time t4" and the brightness adjustment is completed.

At time t5", $V_{CLK}$ has a falling edge indicating a turn-off operation of the power switch 1404. At time t6", the time period when the power switch 1404 is off, e.g., from t5" to t6", reaches the time threshold $T_{TH\_VDD}$, which indicates that the supply voltage at terminal VDD drops below $V_{TH\_VDD}$. In response, the UVL circuit 1504 sets VALUE_1510 and VALUE_1520 both to 0 again, in one embodiment. As such, the light source 1412 is cut off at time t6".

Referring back to FIG. 15, the dimming controller 1408 can also operate in the analog dimming mode to adjust the brightness of the light source 1412. In one embodiment, the inverting input terminal of the comparator 1530 is coupled to the output of the D/A converter 1512, and the inverting input terminal of the comparator 1540 is coupled to the output of the D/A converter 1522. As such, the reference signals REF1 and REF2 can be determined by the counter values of the counters 1510 and 1520, respectively. Therefore, by controlling the peak levels of the currents flowing through the light source LED1 and the light source LED2 according to the counter values, the brightness adjustment is achieved.

Figure 19:
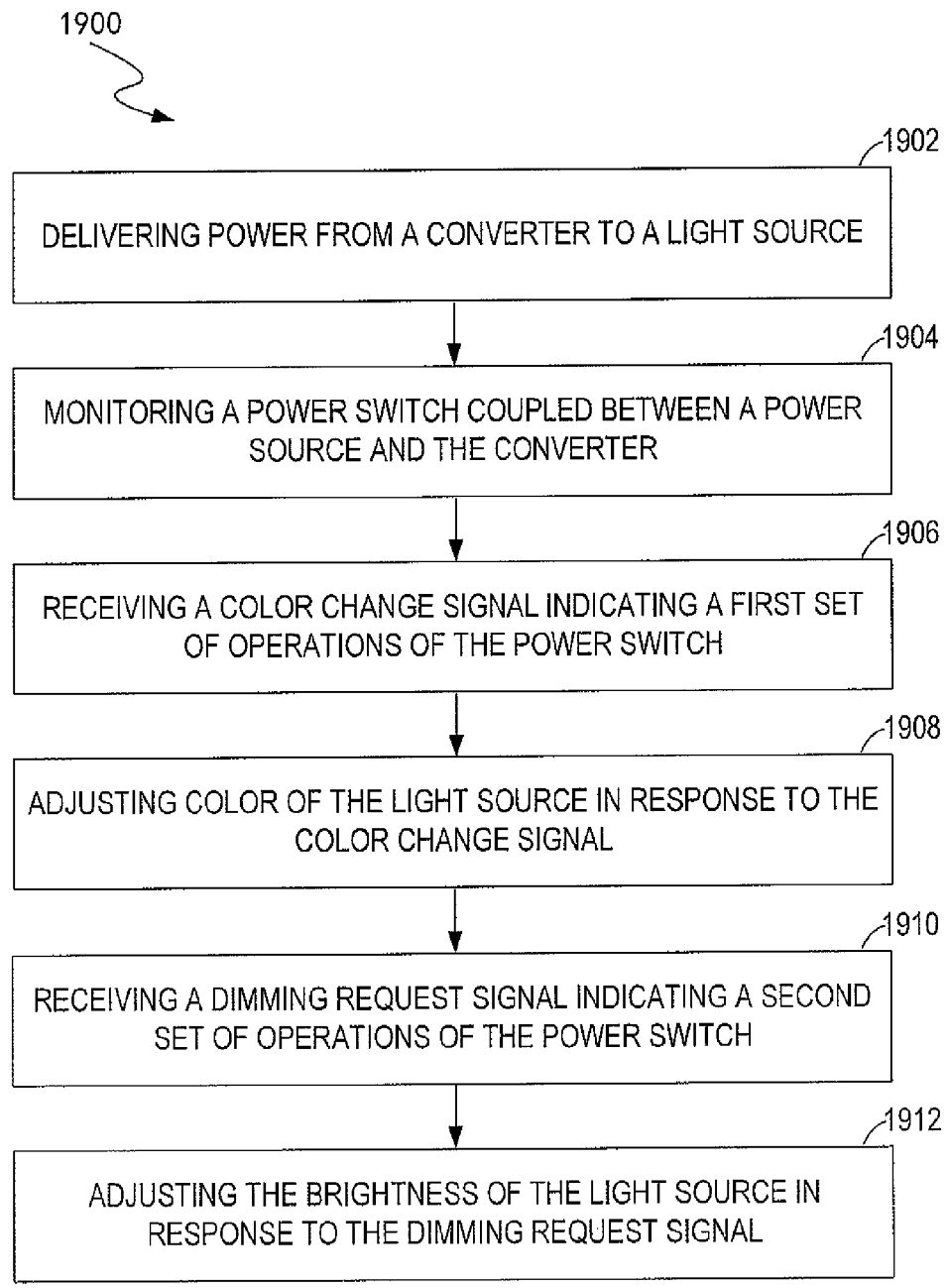
FIG. 19 shows a flowchart of a method for adjusting power of a light source, in accordance with one embodiment of the present invention.

FIG. 19 shows a flowchart 1900 of a method for adjusting power of a light source, in accordance with one embodiment of the present invention. FIG. 19 is described in combination with FIG. 14A-FIG. 18. Although specific steps are disclosed in FIG. 19, such steps are examples. That is, the present invention is well suited to performing various other steps or variations of the steps recited in FIG. 19.

In block 1902, power is delivered from a converter 1410 to a light source, e.g., the light source 1412. In block 1904, a power switch, e.g., the power switch 1404, coupled between a power source and the converter is monitored.

In block 1906, a color change signal indicating a first set of operations of the power switch is received. In block 1908, color of the light source is adjusted in response to the color change signal. In block 1910, a dimming request signal indicating a second set of operations is received. In block 1912, brightness of the light source is adjusted in response to the dimming request signal. In one embodiment, a detection signal indicating a conductance status of the power switch is received. Multiple operations of the power switch including a turn-off operation and a turn-on operation is identified according to the detection signal. The first set of operations and the second set of operations are identified according to time intervals between the operations. In one embodiment, the brightness is adjusted for a predetermined time period, e.g., $T_{TH2}$, or until receiving the dimming termination signal indicating the third set of operations of the power switch 1404. In one embodiment, the color and the brightness of the light source 1412 are adjusted by adjusting counter values of the counters, e.g., the counters 1552 and 1554.

Accordingly, embodiments in accordance with the present invention provide a light source driving circuit for driving a light source including LEDs. Advantageously, a user can select light color by applying the first set of operations to the power switch 1404 and can also enable a brightness adjustment by applying the second set of operations to the same power switch 1404. During the brightness adjustment process, the brightness of the light source gradually decreases or increases. If a desired brightness has been achieved, the user can terminate the brightness adjustment by applying a third set of operations to the power switch 1404. Therefore, extra apparatus for color selection and light dimming, such as an external remote controller or a specially designed switch with adjusting buttons, is avoided and the cost is reduced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A driving circuit for driving a light source comprising a plurality of light-emitting diodes (LEDs), said driving circuit comprising:
  a converter coupled to a power source and operable for receiving power from said power source and for providing regulated power to said light source according to a plurality of control signals; and
  a dimming controller coupled to said converter and operable for monitoring a power switch coupled between said power source and said converter, for receiving a color change signal indicating a first set of operations of said power switch and a dimming request signal indicating a second set of operations of said power switch, for controlling said control signals to change the color of light emitted from said light source in response to said color change signal, and for controlling said control signals to adjust the brightness of said light in response to said dimming request signal, wherein said dimming controller comprises:
    a trigger monitoring unit operable for receiving a detection signal indicating a conductance status of said power switch, and for identifying said first set of operations and said second set of operations based on said detection signal.

2. The driving circuit as claimed in claim 1, wherein said first set of operations comprises a first turn-off operation followed by a first turn-on operation, wherein said second set of operations comprises a second turn-off operation followed by a second turn-on operation, and wherein a time interval between said first turn-off operation and said first turn-on operation is different from a time interval between said second turn-off operation and said second turn-on operation.

3. The driving circuit as claimed in claim 1, wherein said dimming controller adjusts said brightness in response to said dimming request signal until a dimming termination signal indicating a third set of operations of said power switch is received.

4. The driving circuit as claimed in claim 3, wherein said second set of operations comprises a first turn-off operation followed by a first turn-on operation, wherein said third set of operations comprises a second turn-off operation followed by a second turn-on operation, and wherein a time interval between said first turn-on operation and said second turn-off operation is less than a time threshold.

5. The driving circuit as claimed in claim 1, wherein said light source comprises a first LED light-source operable for emitting light having a first color and a second LED light source operable for emitting light having a second color.

6. The driving circuit as claimed in claim 1, wherein said trigger monitoring unit identifies a plurality of operations of said power switch comprising a turn-on operation and a turn-off operation based on said detection signal, and identifies said first set of operations and said second set of operations based on time intervals between said plurality of operations.

7. The driving circuit as claimed in claim 1, wherein said dimming controller comprises:
  a plurality of dimmers operable for adjusting counter values of a plurality of counters respectively according to said color change signal and said dimming request signal, wherein said dimming controller adjusts said control signals respectively according to said counter values.

8. The driving circuit as claimed in claim 7, wherein said dimming controller further comprises:
  an under-voltage-lockout circuit coupled to said dimmers and operable for detecting a supply voltage, for setting said counter values to a first set of predetermined values when said supply voltage drops below a voltage threshold, and for setting said counter values to a second set of predetermined values when said supply voltage rises above said voltage threshold.

9. The driving circuit as claimed in claim 7, wherein said dimmers exchange said counter values of said counters if said color change signal is received, and wherein said control signals are adjusted according to said exchanged counter values to change said color and maintain said brightness.

10. A method for driving a light source comprising a plurality of light-emitting diodes (LEDs), said method comprising:
  delivering power from a converter to said light source;
  monitoring a power switch coupled between a power source and said converter;
  receiving a color change signal indicating a first set of operations of said power switch;
  adjusting color of said light source in response to said color change signal;

receiving a dimming request signal indicating a second set of operations of said power switch;

adjusting brightness of said light source in response to said dimming request signal;

receiving a detection signal indicating a conductance status of said power switch;

identifying a plurality of operations of said power switch comprising a turn-off operation and a turn-on operation according to said detection signal; and identifying said first set of operations and said second set of operations according to time intervals between said plurality of operations.

11. The method as claimed in claim 10, further comprising:

adjusting the brightness of said light source in response to said dimming request signal until a dimming termination signal is received.

* * * * *